(12) United States Patent
Thrasher et al.

(10) Patent No.: US 9,769,354 B2
(45) Date of Patent: Sep. 19, 2017

(54) SYSTEMS AND METHODS OF PROCESSING SCANNED DATA

(71) Applicant: Kofax, Inc., Irvine, CA (US)

(72) Inventors: Christopher W. Thrasher, Rochester, NY (US); Alexander Shustorovich, Pittsford, NY (US); Stephen Michael Thompson, Oceanside, CA (US); Jan W. Amtrup, Silver Spring, MD (US); Anthony Macciola, Irvine, CA (US); Roland G. Borrey, Villa Park, CA (US); Mauritius A. R. Schmidtler, Escondido, CA (US); Robert A. Taylor, Irvine, CA (US); Joel S. Fechter, Huntington Beach, CA (US); Hari S. Asuri, Irvine, CA (US)

(73) Assignee: KOFAX, INC., Irvine, CA (US)

( * ) Notice: Subject to any disclaimer, the term of this patent is extended or adjusted under 35 U.S.C. 154(b) by 0 days.

(21) Appl. No.: 14/814,455

(22) Filed: Jul. 30, 2015

(65) Prior Publication Data

US 2016/0028921 A1 Jan. 28, 2016

Related U.S. Application Data

(63) Continuation-in-part of application No. 14/266,671, filed on Apr. 30, 2014, now Pat. No. 9,129,210, (Continued)

(51) Int. Cl.
*H04N 1/409* (2006.01)
*H04N 1/23* (2006.01)
(Continued)

(52) U.S. Cl.
CPC ......... *H04N 1/4092* (2013.01); *G06K 9/3208* (2013.01); *G06K 15/407* (2013.01);
(Continued)

(58) Field of Classification Search
CPC ...... G06K 9/3208; H04N 1/2338; H04N 1/60; H04N 1/6027
(Continued)

(56) References Cited

U.S. PATENT DOCUMENTS 1,660,102 A 2/1928 Appelt et al.
3,069,654 A 12/1962 Hough
(Continued)

FOREIGN PATENT DOCUMENTS

CN 101052991 A 10/2007
EP 0549329 A2 6/1993
(Continued)

OTHER PUBLICATIONS

Non-Final Office Action from U.S. Appl. No. 13/898,407, dated Aug. 1, 2013.
(Continued)

*Primary Examiner* — Jamares Q Washington
(74) *Attorney, Agent, or Firm* — Zilka-Kotab, P.C.

(57) ABSTRACT

An efficient method and system to enhance digital acquisition devices for analog data is presented. The enhancements offered by the method and system are available to the user in local as well as in remote deployments yielding efficiency gains for a large variety of business processes. The quality enhancements of the acquired digital data are achieved efficiently by employing virtual reacquisition. The method of virtual reacquisition renders unnecessary the physical reacquisition of the analog data in case the digital data obtained by the acquisition device are of insufficient quality. The method and system allows multiple users to access the same acquisition device for analog data. In some embodiments, one or more users can virtually reacquire data provided by multiple analog or digital sources. The acquired raw data can be processed by each user according to his (Continued)

personal preferences and/or requirements. The preferred processing settings and attributes are determined interactively in real time as well as non real time, automatically and a combination thereof.

19 Claims, 21 Drawing Sheets

Related U.S. Application Data which is a continuation of application No. 11/329,999, filed on Jan. 11, 2006, now Pat. No. 8,749,839.

(60) Provisional application No. 62/194,783, filed on Jul. 20, 2015, provisional application No. 60/665,067, filed on Mar. 24, 2005.

(51) Int. Cl.
| | | |
|---|---|---|
| *H04N 1/60* | (2006.01) | |
| *H04N 1/40* | (2006.01) | |
| *H04N 1/58* | (2006.01) | |
| *G06K 9/32* | (2006.01) | |
| *G06K 15/00* | (2006.01) | |

(52) U.S. Cl.
CPC ............ *H04N 1/2338* (2013.01); *H04N 1/40* (2013.01); *H04N 1/40012* (2013.01); *H04N 1/58* (2013.01); *H04N 1/60* (2013.01); *H04N 1/6016* (2013.01); *H04N 1/6027* (2013.01); H04N 2201/0093 (2013.01)

(58) Field of Classification Search
USPC ....... 358/1.9, 2.1, 3.24, 3.27, 1.11, 518, 519
See application file for complete search history.

(56) References Cited

U.S. PATENT DOCUMENTS

| | | |
|---|---|---|
| 3,696,599 A | 10/1972 | Palmer et al. |
| 4,558,461 A | 12/1985 | Schlang |
| 4,651,287 A | 3/1987 | Tsao |
| 4,656,665 A | 4/1987 | Pennebaker |
| 4,836,026 A | 6/1989 | P'an et al. |
| 4,903,312 A | 2/1990 | Sato |
| 4,992,863 A | 2/1991 | Moriya |
| 5,020,112 A | 5/1991 | Chou |
| 5,063,604 A | 11/1991 | Weiman |
| 5,101,448 A | 3/1992 | Kawachiya et al. |
| 5,124,810 A | 6/1992 | Seto |
| 5,151,260 A | 9/1992 | Contursi et al. |
| 5,159,667 A | 10/1992 | Borrey et al. |
| 5,181,260 A | 1/1993 | Kurosu et al. |
| 5,202,934 A | 4/1993 | Miyakawa et al. |
| 5,220,621 A | 6/1993 | Saitoh |
| 5,268,967 A | 12/1993 | Jang et al. |
| 5,282,055 A | 1/1994 | Suzuki |
| 5,293,429 A | 3/1994 | Pizano et al. |
| 5,313,527 A | 5/1994 | Guberman et al. |
| 5,317,646 A | 5/1994 | Sang, Jr. et al. |
| 5,321,770 A | 6/1994 | Huttenlocher et al. |
| 5,344,132 A | 9/1994 | LeBrun et al. |
| 5,353,673 A | 10/1994 | Lynch |
| 5,355,547 A | 10/1994 | Fitjer |
| 5,375,197 A | 12/1994 | Kang |
| 5,430,810 A | 7/1995 | Saeki |
| 5,467,407 A | 11/1995 | Guberman et al. |
| 5,473,742 A | 12/1995 | Polyakov et al. |
| 5,546,474 A | 8/1996 | Zuniga |
| 5,563,723 A | 10/1996 | Beaulieu et al. |
| 5,563,966 A | 10/1996 | Ise et al. |
| 5,586,199 A | 12/1996 | Kanda et al. |
| 5,594,815 A * | 1/1997 | Fast .................... G06K 9/3283 382/245 |
| 5,596,655 A | 1/1997 | Lopez |
| 5,602,964 A | 2/1997 | Barrett |
| 5,629,989 A | 5/1997 | Osada |
| 5,652,663 A | 7/1997 | Zelten |
| 5,668,890 A | 9/1997 | Winkelman |
| 5,680,525 A | 10/1997 | Sakai et al. |
| 5,696,611 A | 12/1997 | Nishimura et al. |
| 5,696,805 A | 12/1997 | Gaborski et al. |
| 5,699,244 A | 12/1997 | Clark, Jr. et al. |
| 5,717,794 A | 2/1998 | Koga et al. |
| 5,721,940 A | 2/1998 | Luther et al. |
| 5,757,963 A | 5/1998 | Ozaki et al. |
| 5,760,912 A | 6/1998 | Itoh |
| 5,781,665 A | 7/1998 | Cullen et al. |
| 5,818,978 A * | 10/1998 | Al-Hussein ........ G06K 9/00456 382/296 |
| 5,822,454 A | 10/1998 | Rangarajan |
| 5,825,915 A | 10/1998 | Michimoto et al. |
| 5,832,138 A | 11/1998 | Nakanishi et al. |
| 5,839,019 A | 11/1998 | Ito |
| 5,848,184 A | 12/1998 | Taylor et al. |
| 5,857,029 A | 1/1999 | Patel |
| 5,867,264 A | 2/1999 | Hinnrichs |
| 5,923,763 A | 7/1999 | Walker et al. |
| 5,937,084 A | 8/1999 | Crabtree et al. |
| 5,953,388 A | 9/1999 | Walnut et al. |
| 5,956,468 A | 9/1999 | Ancin |
| 5,987,172 A | 11/1999 | Michael |
| 6,002,489 A | 12/1999 | Murai et al. |
| 6,005,958 A | 12/1999 | Farmer et al. |
| 6,005,968 A | 12/1999 | Granger |
| 6,009,191 A | 12/1999 | Julier |
| 6,009,196 A | 12/1999 | Mahoney |
| 6,011,595 A | 1/2000 | Henderson et al. |
| 6,016,361 A | 1/2000 | Hongu et al. |
| 6,038,348 A | 3/2000 | Carley |
| 6,055,968 A | 5/2000 | Sasaki et al. |
| 6,067,385 A | 5/2000 | Cullen et al. |
| 6,072,916 A | 6/2000 | Suzuki |
| 6,073,148 A | 6/2000 | Rowe et al. |
| 6,098,065 A | 8/2000 | Skillen et al. |
| 6,104,830 A | 8/2000 | Schistad |
| 6,104,840 A | 8/2000 | Ejiri et al. |
| 6,118,544 A | 9/2000 | Rao |
| 6,118,552 A | 9/2000 | Suzuki et al. |
| 6,154,217 A | 11/2000 | Aldrich |
| 6,192,360 B1 | 2/2001 | Dumais et al. |
| 6,215,469 B1 | 4/2001 | Mori et al. |
| 6,219,158 B1 | 4/2001 | Dawe |
| 6,219,773 B1 | 4/2001 | Garibay, Jr. et al. |
| 6,223,223 B1 | 4/2001 | Kumpf et al. |
| 6,229,625 B1 | 5/2001 | Nakatsuka |
| 6,233,059 B1 | 5/2001 | Kodaira et al. |
| 6,263,122 B1 | 7/2001 | Simske et al. |
| 6,292,168 B1 | 9/2001 | Venable et al. |
| 6,327,581 B1 | 12/2001 | Platt |
| 6,337,925 B1 | 1/2002 | Cohen et al. |
| 6,347,152 B1 | 2/2002 | Shinagawa et al. |
| 6,347,162 B1 | 2/2002 | Suzuki |
| 6,356,647 B1 | 3/2002 | Bober et al. |
| 6,370,277 B1 | 4/2002 | Borrey et al. |
| 6,385,346 B1 | 5/2002 | Gillihan et al. |
| 6,393,147 B2 | 5/2002 | Danneels et al. |
| 6,396,599 B1 | 5/2002 | Patton et al. |
| 6,408,094 B1 | 6/2002 | Mirzaoff et al. |
| 6,408,105 B1 | 6/2002 | Maruo |
| 6,424,742 B2 | 7/2002 | Yamamoto et al. |
| 6,426,806 B2 | 7/2002 | Melen |
| 6,433,896 B1 | 8/2002 | Ueda et al. |
| 6,456,738 B1 | 9/2002 | Tsukasa |
| 6,463,430 B1 | 10/2002 | Brady et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,480,624 B1 | 11/2002 | Horie et al. |
| 6,501,855 B1 | 12/2002 | Zelinski |
| 6,512,848 B2 | 1/2003 | Wang et al. |
| 6,522,791 B2 | 2/2003 | Nagarajan |

(56) References Cited

U.S. PATENT DOCUMENTS

| | | |
|---|---|---|
| 6,525,840 B1 | 2/2003 | Haraguchi et al. |
| 6,563,531 B1 | 5/2003 | Matama |
| 6,601,026 B2 | 7/2003 | Appelt et al. |
| 6,614,930 B1 | 9/2003 | Agnihotri et al. |
| 6,621,595 B1 | 9/2003 | Fan et al. |
| 6,628,416 B1 | 9/2003 | Hsu et al. |
| 6,628,808 B1 * | 9/2003 | Bach ............... G06K 9/036 235/380 |
| 6,633,857 B1 | 10/2003 | Tipping |
| 6,643,413 B1 | 11/2003 | Shum et al. |
| 6,646,765 B1 | 11/2003 | Barker et al. |
| 6,658,147 B2 | 12/2003 | Gorbatov et al. |
| 6,665,425 B1 | 12/2003 | Sampath et al. |
| 6,667,774 B2 | 12/2003 | Berman et al. |
| 6,675,159 B1 | 1/2004 | Lin et al. |
| 6,701,009 B1 | 3/2004 | Makoto et al. |
| 6,704,441 B1 | 3/2004 | Inagaki et al. |
| 6,724,916 B1 | 4/2004 | Shyu |
| 6,729,733 B1 | 5/2004 | Raskar et al. |
| 6,732,046 B1 | 5/2004 | Joshi |
| 6,748,109 B1 | 6/2004 | Yamaguchi |
| 6,751,349 B2 | 6/2004 | Matama |
| 6,757,081 B1 | 6/2004 | Fan et al. |
| 6,757,427 B1 | 6/2004 | Hongu |
| 6,763,515 B1 | 7/2004 | Vazquez et al. |
| 6,765,685 B1 | 7/2004 | Yu |
| 6,778,684 B1 | 8/2004 | Bollman |
| 6,781,375 B2 | 8/2004 | Miyazaki et al. |
| 6,788,830 B1 | 9/2004 | Morikawa |
| 6,789,069 B1 | 9/2004 | Barnhill et al. |
| 6,801,658 B2 | 10/2004 | Morita et al. |
| 6,816,187 B1 | 11/2004 | Iwai et al. |
| 6,826,311 B2 | 11/2004 | Wilt |
| 6,831,755 B1 | 12/2004 | Narushima et al. |
| 6,839,466 B2 | 1/2005 | Venable |
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |
| 6,917,709 B2 | 7/2005 | Zelinski |
| 6,921,220 B2 | 7/2005 | Aiyama |
| 6,950,555 B2 | 9/2005 | Filatov et al. |
| 6,987,534 B1 | 1/2006 | Seta |
| 6,989,914 B2 | 1/2006 | Iwaki |
| 6,999,625 B1 | 2/2006 | Nelson |
| 7,006,707 B2 | 2/2006 | Peterson |
| 7,016,549 B1 | 3/2006 | Utagawa |
| 7,017,108 B1 | 3/2006 | Wan |
| 7,020,320 B2 | 3/2006 | Filatov |
| 7,023,447 B2 | 4/2006 | Luo et al. |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |
| 7,054,036 B2 | 5/2006 | Hirayama |
| 7,081,975 B2 | 7/2006 | Yoda et al. |
| 7,082,426 B2 | 7/2006 | Musgrove et al. |
| 7,107,285 B2 | 9/2006 | von Kaenel et al. |
| 7,123,292 B1 | 10/2006 | Seeger et al. |
| 7,123,387 B2 | 10/2006 | Cheng et al. |
| 7,130,471 B2 | 10/2006 | Bossut et al. |
| 7,145,699 B2 | 12/2006 | Dolan |
| 7,167,281 B1 | 1/2007 | Fujimoto et al. |
| 7,168,614 B2 | 1/2007 | Kotovich et al. |
| 7,173,732 B2 | 2/2007 | Matama |
| 7,174,043 B2 | 2/2007 | Lossev et al. |
| 7,177,049 B2 | 2/2007 | Karidi |
| 7,181,082 B2 | 2/2007 | Feng |
| 7,184,929 B2 | 2/2007 | Goodman |
| 7,194,471 B1 | 3/2007 | Nagatsuka et al. |
| 7,197,158 B2 | 3/2007 | Camara et al. |
| 7,201,323 B2 | 4/2007 | Kotovich et al. |
| 7,209,599 B2 | 4/2007 | Simske et al. |
| 7,228,314 B2 | 6/2007 | Kawamoto et al. |
| 7,249,717 B2 | 7/2007 | Kotovich et al. |
| 7,251,777 B1 | 7/2007 | Valtchev et al. |
| 7,253,836 B1 | 8/2007 | Suzuki et al. |
| 7,263,221 B1 | 8/2007 | Moriwaki |
| 7,266,768 B2 | 9/2007 | Ferlitsch et al. |
| 7,286,177 B2 | 10/2007 | Cooper |
| 7,298,897 B1 * | 11/2007 | Dominguez ............ G06T 7/11 382/172 |
| 7,317,828 B2 | 1/2008 | Suzuki et al. |
| 7,337,389 B1 | 2/2008 | Woolf et al. |
| 7,339,585 B2 | 3/2008 | Verstraelen et al. |
| 7,340,376 B2 | 3/2008 | Goodman |
| 7,349,888 B1 | 3/2008 | Heidenreich et al. |
| 7,365,881 B2 | 4/2008 | Burns et al. |
| 7,366,705 B2 | 4/2008 | Zeng et al. |
| 7,382,921 B2 | 6/2008 | Lossev et al. |
| 7,386,527 B2 | 6/2008 | Harris et al. |
| 7,392,426 B2 | 6/2008 | Wolfe et al. |
| 7,403,008 B2 | 7/2008 | Blank et al. |
| 7,403,313 B2 | 7/2008 | Kuo |
| 7,406,183 B2 | 7/2008 | Emerson et al. |
| 7,409,092 B2 | 8/2008 | Srinivasa |
| 7,409,633 B2 | 8/2008 | Lerner et al. |
| 7,416,131 B2 | 8/2008 | Fortune et al. |
| 7,426,293 B2 | 9/2008 | Chien et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,464,066 B2 | 12/2008 | Zelinski et al. |
| 7,478,332 B2 | 1/2009 | Buttner et al. |
| 7,487,438 B1 | 2/2009 | Withers |
| 7,492,478 B2 | 2/2009 | Une |
| 7,492,943 B2 | 2/2009 | Li et al. |
| 7,515,313 B2 | 4/2009 | Cheng |
| 7,515,772 B2 | 4/2009 | Li et al. |
| 7,528,883 B2 | 5/2009 | Hsu |
| 7,542,931 B2 | 6/2009 | Black et al. |
| 7,545,529 B2 | 6/2009 | Borrey et al. |
| 7,553,095 B2 | 6/2009 | Kimura |
| 7,562,060 B2 | 7/2009 | Sindhwani et al. |
| 7,580,557 B2 | 8/2009 | Zavadsky et al. |
| 7,636,479 B2 | 12/2009 | Luo et al. |
| 7,639,387 B2 | 12/2009 | Hull et al. |
| 7,643,665 B2 | 1/2010 | Zavadsky et al. |
| 7,651,286 B2 | 1/2010 | Tischler |
| 7,655,685 B2 | 2/2010 | McElroy et al. |
| 7,657,091 B2 | 2/2010 | Postnikov et al. |
| 7,665,061 B2 | 2/2010 | Kothari et al. |
| 7,673,799 B2 | 3/2010 | Hart et al. |
| 7,702,162 B2 | 4/2010 | Cheong et al. |
| 7,735,721 B1 | 6/2010 | Ma et al. |
| 7,738,730 B2 | 6/2010 | Hawley |
| 7,739,127 B1 | 6/2010 | Hall |
| 7,761,391 B2 | 7/2010 | Schmidtler et al. |
| 7,778,457 B2 | 8/2010 | Nepomniachtchi et al. |
| 7,782,384 B2 | 8/2010 | Kelly |
| 7,787,695 B2 | 8/2010 | Nepomniachtchi et al. |
| 7,937,345 B2 | 5/2011 | Schmidtler et al. |
| 7,941,744 B2 | 5/2011 | Oppenlander et al. |
| 7,949,167 B2 | 5/2011 | Krishnan et al. |
| 7,949,176 B2 | 5/2011 | Nepomniachtchi |
| 7,949,660 B2 | 5/2011 | Green et al. |
| 7,953,268 B2 | 5/2011 | Nepomniachtchi |
| 7,958,067 B2 | 6/2011 | Schmidtler et al. |
| 7,978,900 B2 | 7/2011 | Nepomniachtchi et al. |
| 7,999,961 B2 | 8/2011 | Wanda |
| 8,000,514 B2 | 8/2011 | Nepomniachtchi et al. |
| 8,035,641 B1 | 10/2011 | O'Donnell |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,081,227 B1 | 12/2011 | Kim et al. |
| 8,094,976 B2 | 1/2012 | Berard et al. |
| 8,135,656 B2 | 3/2012 | Evanitsky |
| 8,136,114 B1 | 3/2012 | Gailloux et al. |
| 8,184,156 B2 | 5/2012 | Mino et al. |
| 8,194,965 B2 | 6/2012 | Lossev et al. |

(56) References Cited

U.S. PATENT DOCUMENTS

| | | |
|---|---|---|
| 8,213,687 B2 | 7/2012 | Fan |
| 8,238,880 B2 | 8/2012 | Jin et al. |
| 8,239,335 B2 | 8/2012 | Schmidtler et al. |
| 8,244,031 B2 | 8/2012 | Cho et al. |
| 8,265,422 B1 | 9/2012 | Jin |
| 8,279,465 B2 | 10/2012 | Couchman |
| 8,295,599 B2 | 10/2012 | Katougi et al. |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,354,981 B2 | 1/2013 | Kawasaki et al. |
| 8,374,977 B2 | 2/2013 | Schmidtler et al. |
| 8,379,914 B2 | 2/2013 | Nepomniachtchi et al. |
| 8,385,647 B2 | 2/2013 | Hawley et al. |
| 8,406,480 B2 | 3/2013 | Grigsby et al. |
| 8,433,775 B2 | 4/2013 | Buchhop et al. |
| 8,441,548 B1 | 5/2013 | Nechyba et al. |
| 8,443,286 B2 | 5/2013 | Cameron |
| 8,452,098 B2 | 5/2013 | Nepomniachtchi et al. |
| 8,478,052 B1 | 7/2013 | Yee et al. |
| 8,483,473 B2 | 7/2013 | Roach et al. |
| 8,503,797 B2 | 8/2013 | Turkelson et al. |
| 8,515,163 B2 | 8/2013 | Cho et al. |
| 8,515,208 B2 | 8/2013 | Minerich |
| 8,526,739 B2 | 9/2013 | Schmidtler et al. |
| 8,532,419 B2 | 9/2013 | Coleman |
| 8,559,766 B2 | 10/2013 | Tilt et al. |
| 8,577,118 B2 | 11/2013 | Nepomniachtchi et al. |
| 8,582,862 B2 | 11/2013 | Nepomniachtchi et al. |
| 8,587,818 B2 | 11/2013 | Imaizumi et al. |
| 8,620,058 B2 | 12/2013 | Nepomniachtchi et al. |
| 8,639,621 B1 | 1/2014 | Ellis et al. |
| 8,675,953 B1 | 3/2014 | Elwell et al. |
| 8,676,165 B2 | 3/2014 | Cheng et al. |
| 8,677,249 B2 | 3/2014 | Buttner et al. |
| 8,693,043 B2 | 4/2014 | Schmidtler et al. |
| 8,705,836 B2 | 4/2014 | Gorski et al. |
| 8,719,197 B2 | 5/2014 | Schmidtler et al. |
| 8,745,488 B1 | 6/2014 | Wong |
| 8,749,839 B2 | 6/2014 | Borrey et al. |
| 8,774,516 B2 | 7/2014 | Amtrup et al. |
| 8,805,125 B1 | 8/2014 | Kumar et al. |
| 8,813,111 B2 | 8/2014 | Guerin et al. |
| 8,823,991 B2 | 9/2014 | Borrey et al. |
| 8,855,375 B2 | 10/2014 | Macciola et al. |
| 8,855,425 B2 | 10/2014 | Schmidtler et al. |
| 8,879,120 B2 | 11/2014 | Thrasher et al. |
| 8,879,783 B1 | 11/2014 | Wang et al. |
| 8,879,846 B2 | 11/2014 | Amtrup et al. |
| 8,885,229 B1 | 11/2014 | Amtrup et al. |
| 8,908,977 B2 | 12/2014 | King |
| 8,955,743 B1 | 2/2015 | Block et al. |
| 8,971,587 B2 | 3/2015 | Macciola et al. |
| 8,989,515 B2 | 3/2015 | Shustorovich et al. |
| 8,995,012 B2 | 3/2015 | Heit et al. |
| 8,995,769 B2 | 3/2015 | Carr |
| 9,058,515 B1 | 6/2015 | Amtrup et al. |
| 9,058,580 B1 | 6/2015 | Amtrup et al. |
| 9,064,316 B2 | 6/2015 | Eid et al. |
| 9,117,117 B2 | 8/2015 | Macciola et al. |
| 9,129,210 B2 | 9/2015 | Borrey et al. |
| 9,137,417 B2 | 9/2015 | Macciola et al. |
| 9,141,926 B2 | 9/2015 | Kilby et al. |
| 9,158,967 B2 | 10/2015 | Shustorovich et al. |
| 9,165,187 B2 | 10/2015 | Macciola et al. |
| 9,165,188 B2 | 10/2015 | Thrasher et al. |
| 9,208,536 B2 | 12/2015 | Macciola et al. |
| 9,253,349 B2 | 2/2016 | Amtrup et al. |
| 9,275,281 B2 | 3/2016 | Macciola |
| 9,311,531 B2 | 4/2016 | Amtrup et al. |
| 9,342,741 B2 | 5/2016 | Amtrup et al. |
| 9,342,742 B2 | 5/2016 | Amtrup et al. |
| 9,355,312 B2 | 5/2016 | Amtrup et al. |
| 9,386,235 B2 | 7/2016 | Ma et al. |
| 9,483,794 B2 | 11/2016 | Amtrup et al. |
| 9,514,357 B2 | 12/2016 | Macciola et al. |
| 9,576,272 B2 | 2/2017 | Macciola et al. |
| 9,584,729 B2 | 2/2017 | Amtrup et al. |
| 2001/0027420 A1 | 10/2001 | Boublik et al. |
| 2002/0030831 A1 | 3/2002 | Kinjo |
| 2002/0054693 A1 | 5/2002 | Elmenhurst |
| 2002/0069218 A1 | 6/2002 | Sull et al. |
| 2002/0113801 A1* | 8/2002 | Reavy .................. G09G 5/02 345/589 |
| 2002/0122071 A1 | 9/2002 | Camara et al. |
| 2002/0126313 A1 | 9/2002 | Namizuka |
| 2002/0165717 A1 | 11/2002 | Solmer et al. |
| 2003/0002068 A1 | 1/2003 | Constantin et al. |
| 2003/0007683 A1 | 1/2003 | Wang et al. |
| 2003/0026479 A1 | 2/2003 | Thomas et al. |
| 2003/0030638 A1 | 2/2003 | Astrom et al. |
| 2003/0044012 A1 | 3/2003 | Eden |
| 2003/0046445 A1 | 3/2003 | Witt et al. |
| 2003/0053696 A1 | 3/2003 | Schmidt et al. |
| 2003/0063213 A1* | 4/2003 | Poplin .................. H04N 5/232 348/362 |
| 2003/0086615 A1 | 5/2003 | Dance et al. |
| 2003/0095709 A1 | 5/2003 | Zhou |
| 2003/0101161 A1 | 5/2003 | Ferguson et al. |
| 2003/0117511 A1 | 6/2003 | Belz et al. |
| 2003/0120653 A1 | 6/2003 | Brady et al. |
| 2003/0142328 A1 | 7/2003 | McDaniel et al. |
| 2003/0151674 A1 | 8/2003 | Lin |
| 2003/0156201 A1 | 8/2003 | Zhang |
| 2003/0197063 A1 | 10/2003 | Longacre |
| 2003/0210428 A1 | 11/2003 | Bevlin et al. |
| 2003/0223615 A1 | 12/2003 | Keaton et al. |
| 2004/0019274 A1 | 1/2004 | Galloway et al. |
| 2004/0021909 A1 | 2/2004 | Kikuoka |
| 2004/0022437 A1 | 2/2004 | Beardsley |
| 2004/0049401 A1 | 3/2004 | Carr et al. |
| 2004/0083119 A1 | 4/2004 | Schunder et al. |
| 2004/0090458 A1 | 5/2004 | Yu et al. |
| 2004/0093119 A1 | 5/2004 | Gunnarsson et al. |
| 2004/0102989 A1 | 5/2004 | Jang et al. |
| 2004/0111453 A1 | 6/2004 | Harris et al. |
| 2004/0143796 A1 | 7/2004 | Lerner et al. |
| 2004/0169873 A1 | 9/2004 | Nagarajan |
| 2004/0169889 A1 | 9/2004 | Sawada |
| 2004/0175033 A1 | 9/2004 | Matama |
| 2004/0181482 A1 | 9/2004 | Yap |
| 2004/0190019 A1 | 9/2004 | Li et al. |
| 2004/0223640 A1 | 11/2004 | Bovyrin |
| 2004/0245334 A1 | 12/2004 | Sikorski |
| 2004/0261084 A1 | 12/2004 | Rosenbloom et al. |
| 2004/0263639 A1 | 12/2004 | Sadovsky et al. |
| 2005/0021360 A1 | 1/2005 | Miller et al. |
| 2005/0030602 A1 | 2/2005 | Gregson et al. |
| 2005/0046887 A1 | 3/2005 | Shibata et al. |
| 2005/0050060 A1 | 3/2005 | Damm et al. |
| 2005/0054342 A1 | 3/2005 | Otsuka |
| 2005/0060162 A1 | 3/2005 | Mohit et al. |
| 2005/0063585 A1 | 3/2005 | Matsuura |
| 2005/0065903 A1 | 3/2005 | Zhang et al. |
| 2005/0080844 A1 | 4/2005 | Dathathraya et al. |
| 2005/0100209 A1 | 5/2005 | Lewis et al. |
| 2005/0131780 A1 | 6/2005 | Princen |
| 2005/0134935 A1 | 6/2005 | Schmidtler et al. |
| 2005/0141777 A1 | 6/2005 | Kuwata |
| 2005/0151990 A1 | 7/2005 | Ishikawa et al. |
| 2005/0160065 A1 | 7/2005 | Seeman |
| 2005/0180628 A1 | 8/2005 | Curry et al. |
| 2005/0180632 A1 | 8/2005 | Aradhye et al. |
| 2005/0193325 A1 | 9/2005 | Epstein |
| 2005/0204058 A1 | 9/2005 | Philbrick et al. |
| 2005/0206753 A1 | 9/2005 | Sakurai et al. |
| 2005/0212925 A1 | 9/2005 | Lefebure et al. |
| 2005/0216426 A1 | 9/2005 | Weston et al. |
| 2005/0228591 A1 | 10/2005 | Hur et al. |
| 2005/0234955 A1 | 10/2005 | Zeng et al. |
| 2005/0246262 A1 | 11/2005 | Aggarwal et al. |
| 2005/0265618 A1 | 12/2005 | Jebara |
| 2005/0271265 A1 | 12/2005 | Wang et al. |
| 2005/0273453 A1 | 12/2005 | Holloran |

(56) References Cited

U.S. PATENT DOCUMENTS

| | | |
|---|---|---|
| 2006/0013463 A1* | 1/2006 | Ramsay .................. G06K 9/36 382/132 |
| 2006/0017810 A1 | 1/2006 | Kurzweil et al. |
| 2006/0023271 A1 | 2/2006 | Boay et al. |
| 2006/0031344 A1 | 2/2006 | Mishima et al. |
| 2006/0047704 A1 | 3/2006 | Gopalakrishnan |
| 2006/0048046 A1 | 3/2006 | Joshi et al. |
| 2006/0074821 A1 | 4/2006 | Cristianini |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0126918 A1 | 6/2006 | Oohashi et al. |
| 2006/0147113 A1 | 7/2006 | Han |
| 2006/0159364 A1 | 7/2006 | Poon et al. |
| 2006/0161646 A1 | 7/2006 | Chene et al. |
| 2006/0164682 A1 | 7/2006 | Lev |
| 2006/0195491 A1 | 8/2006 | Nieland et al. |
| 2006/0203107 A1* | 9/2006 | Steinberg .............. H04N 5/232 348/239 |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1 | 10/2006 | Luo et al. |
| 2006/0242180 A1 | 10/2006 | Graf et al. |
| 2006/0256371 A1 | 11/2006 | King et al. |
| 2006/0256392 A1 | 11/2006 | Van Hoof et al. |
| 2006/0257048 A1 | 11/2006 | Lin et al. |
| 2006/0262962 A1 | 11/2006 | Hull et al. |
| 2006/0263134 A1 | 11/2006 | Beppu |
| 2006/0265640 A1 | 11/2006 | Albornoz et al. |
| 2006/0268352 A1 | 11/2006 | Tanigawa et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2006/0294154 A1 | 12/2006 | Shimizu |
| 2007/0002348 A1 | 1/2007 | Hagiwara |
| 2007/0002375 A1 | 1/2007 | Ng |
| 2007/0003155 A1 | 1/2007 | Miller et al. |
| 2007/0005341 A1 | 1/2007 | Burges et al. |
| 2007/0016848 A1 | 1/2007 | Rosenoff et al. |
| 2007/0030540 A1 | 2/2007 | Cheng et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0172151 A1 | 7/2007 | Gennetten et al. |
| 2007/0177818 A1 | 8/2007 | Teshima et al. |
| 2007/0204162 A1 | 8/2007 | Rodriguez |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0004073 A1 | 1/2008 | John et al. |
| 2008/0005678 A1 | 1/2008 | Buttner et al. |
| 2008/0068452 A1 | 3/2008 | Nakao et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0095467 A1 | 4/2008 | Olszak et al. |
| 2008/0097936 A1 | 4/2008 | Schmidtler et al. |
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0147790 A1 | 6/2008 | Malaney et al. |
| 2008/0166025 A1 | 7/2008 | Thorne |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0199081 A1 | 8/2008 | Kimura et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0292144 A1 | 11/2008 | Kim |
| 2008/0294737 A1 | 11/2008 | Kim |
| 2008/0298718 A1 | 12/2008 | Liu et al. |
| 2009/0015687 A1 | 1/2009 | Shinkai et al. |
| 2009/0073266 A1 | 3/2009 | Abdellaziz Trimeche et al. |
| 2009/0089078 A1 | 4/2009 | Bursey |
| 2009/0103808 A1 | 4/2009 | Dey et al. |
| 2009/0132468 A1 | 5/2009 | Putivsky et al. |
| 2009/0132504 A1 | 5/2009 | Vegnaduzzo et al. |
| 2009/0141985 A1 | 6/2009 | Sheinin et al. |
| 2009/0154778 A1 | 6/2009 | Lei et al. |
| 2009/0159509 A1 | 6/2009 | Wojdyla et al. |
| 2009/0175537 A1 | 7/2009 | Tribelhorn et al. |
| 2009/0185241 A1 | 7/2009 | Nepomniachtchi |
| 2009/0214112 A1 | 8/2009 | Borrey et al. |
| 2009/0225180 A1 | 9/2009 | Maruyama et al. |
| 2009/0228499 A1 | 9/2009 | Schmidtler et al. |
| 2009/0285445 A1 | 11/2009 | Vasa |
| 2009/0324025 A1 | 12/2009 | Camp, Jr. et al. |
| 2009/0324062 A1 | 12/2009 | Lim et al. |
| 2010/0007751 A1 | 1/2010 | Icho et al. |
| 2010/0014769 A1 | 1/2010 | Lundgren |
| 2010/0060910 A1 | 3/2010 | Fechter |
| 2010/0060915 A1 | 3/2010 | Suzuki et al. |
| 2010/0062491 A1 | 3/2010 | Lehmbeck |
| 2010/0082491 A1 | 4/2010 | Rosenblatt et al. |
| 2010/0150424 A1 | 6/2010 | Nepomniachtchi et al. |
| 2010/0166318 A1 | 7/2010 | Ben-Horesh et al. |
| 2010/0169250 A1 | 7/2010 | Schmidtler et al. |
| 2010/0202698 A1 | 8/2010 | Schmidtler et al. |
| 2010/0202701 A1 | 8/2010 | Basri et al. |
| 2010/0214584 A1 | 8/2010 | Takahashi |
| 2010/0232706 A1 | 9/2010 | Forutanpour |
| 2010/0280859 A1 | 11/2010 | Frederick, II |
| 2010/0331043 A1 | 12/2010 | Chapman et al. |
| 2011/0013039 A1 | 1/2011 | Aisaka et al. |
| 2011/0025842 A1 | 2/2011 | King et al. |
| 2011/0025860 A1 | 2/2011 | Katougi et al. |
| 2011/0032570 A1 | 2/2011 | Imaizumi et al. |
| 2011/0055033 A1 | 3/2011 | Chen et al. |
| 2011/0090337 A1 | 4/2011 | Klomp et al. |
| 2011/0091092 A1 | 4/2011 | Nepomniachtchi et al. |
| 2011/0116716 A1 | 5/2011 | Kwon et al. |
| 2011/0145178 A1 | 6/2011 | Schmidtler et al. |
| 2011/0182500 A1 | 7/2011 | Esposito et al. |
| 2011/0194127 A1 | 8/2011 | Nagakoshi et al. |
| 2011/0196870 A1 | 8/2011 | Schmidtler et al. |
| 2011/0200107 A1 | 8/2011 | Ryu |
| 2011/0246076 A1 | 10/2011 | Su et al. |
| 2011/0249905 A1 | 10/2011 | Singh et al. |
| 2011/0279456 A1 | 11/2011 | Hiranuma et al. |
| 2011/0280450 A1 | 11/2011 | Nepomniachtchi et al. |
| 2011/0285873 A1 | 11/2011 | Showering |
| 2011/0285874 A1 | 11/2011 | Showering et al. |
| 2012/0019614 A1 | 1/2012 | Murray et al. |
| 2012/0038549 A1 | 2/2012 | Mandella et al. |
| 2012/0057756 A1 | 3/2012 | Yoon et al. |

(56) References Cited

U.S. PATENT DOCUMENTS

| | | |
|---|---|---|
| 2012/0069131 A1 | 3/2012 | Abelow |
| 2012/0075442 A1 | 3/2012 | Vujic |
| 2012/0077476 A1 | 3/2012 | Paraskevakos et al. |
| 2012/0092329 A1 | 4/2012 | Koo et al. |
| 2012/0105662 A1 | 5/2012 | Staudacher et al. |
| 2012/0113489 A1 | 5/2012 | Heit et al. |
| 2012/0114249 A1 | 5/2012 | Conwell |
| 2012/0116957 A1 | 5/2012 | Zanzot et al. |
| 2012/0131139 A1 | 5/2012 | Siripurapu et al. |
| 2012/0134576 A1 | 5/2012 | Sharma et al. |
| 2012/0162527 A1 | 6/2012 | Baker |
| 2012/0194692 A1 | 8/2012 | Mers et al. |
| 2012/0215578 A1 | 8/2012 | Swierz, III et al. |
| 2012/0230577 A1 | 9/2012 | Calman et al. |
| 2012/0230606 A1 | 9/2012 | Sugiyama et al. |
| 2012/0236019 A1 | 9/2012 | Oh et al. |
| 2012/0272192 A1 | 10/2012 | Grossman et al. |
| 2012/0284122 A1 | 11/2012 | Brandis |
| 2012/0290421 A1 | 11/2012 | Qawami et al. |
| 2012/0293607 A1 | 11/2012 | Bhogal et al. |
| 2012/0300020 A1 | 11/2012 | Arth et al. |
| 2012/0301011 A1 | 11/2012 | Grzechnik |
| 2012/0308139 A1 | 12/2012 | Dhir |
| 2013/0004076 A1 | 1/2013 | Koo et al. |
| 2013/0022231 A1 | 1/2013 | Nepomniachtchi et al. |
| 2013/0027757 A1 | 1/2013 | Lee et al. |
| 2013/0057703 A1 | 3/2013 | Vu et al. |
| 2013/0060596 A1 | 3/2013 | Gu et al. |
| 2013/0073459 A1 | 3/2013 | Zacarias et al. |
| 2013/0088757 A1 | 4/2013 | Schmidtler et al. |
| 2013/0090969 A1 | 4/2013 | Rivere |
| 2013/0097157 A1 | 4/2013 | Ng et al. |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0142402 A1 | 6/2013 | Myers et al. |
| 2013/0152176 A1 | 6/2013 | Courtney et al. |
| 2013/0182002 A1 | 7/2013 | Macciola et al. |
| 2013/0182105 A1 | 7/2013 | Fahn et al. |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0188865 A1 | 7/2013 | Saha et al. |
| 2013/0198358 A1 | 8/2013 | Taylor |
| 2013/0223762 A1 | 8/2013 | Nagamasa |
| 2013/0230246 A1 | 9/2013 | Nuggehalli |
| 2013/0251280 A1 | 9/2013 | Borrey et al. |
| 2013/0268378 A1 | 10/2013 | Yovin |
| 2013/0268430 A1 | 10/2013 | Lopez et al. |
| 2013/0271579 A1 | 10/2013 | Wang |
| 2013/0287265 A1 | 10/2013 | Nepomniachtchi et al. |
| 2013/0287284 A1 | 10/2013 | Nepomniachtchi et al. |
| 2013/0297353 A1 | 11/2013 | Strange et al. |
| 2013/0308832 A1 | 11/2013 | Schmidtler et al. |
| 2013/0329023 A1 | 12/2013 | Suplee, III et al. |
| 2014/0003721 A1 | 1/2014 | Saund |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0055826 A1 | 2/2014 | Hinski |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0172687 A1 | 6/2014 | Chirehdast |
| 2014/0181691 A1 | 6/2014 | Poornachandran et al. |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270439 A1 | 9/2014 | Chen |
| 2014/0270536 A1 | 9/2014 | Amtrup et al. |
| 2014/0316841 A1 | 10/2014 | Kilby et al. |
| 2014/0317595 A1 | 10/2014 | Kilby et al. |
| 2014/0327940 A1 | 11/2014 | Amtrup et al. |
| 2014/0328520 A1 | 11/2014 | Macciola et al. |
| 2014/0333971 A1 | 11/2014 | Macciola et al. |
| 2014/0368890 A1 | 12/2014 | Amtrup et al. |
| 2014/0376060 A1 | 12/2014 | Bocharov et al. |
| 2015/0040001 A1 | 2/2015 | Kannan et al. |
| 2015/0040002 A1 | 2/2015 | Kannan et al. |
| 2015/0098628 A1 | 4/2015 | Macciola et al. |
| 2015/0120564 A1 | 4/2015 | Smith et al. |
| 2015/0161765 A1 | 6/2015 | Kota et al. |
| 2015/0170085 A1 | 6/2015 | Amtrup et al. |
| 2015/0324640 A1 | 11/2015 | Macciola et al. |
| 2015/0339526 A1 | 11/2015 | Macciola et al. |
| 2015/0347861 A1 | 12/2015 | Doepke et al. |
| 2015/0355889 A1 | 12/2015 | Kilby et al. |
| 2016/0019530 A1 | 1/2016 | Wang et al. |
| 2016/0028921 A1 | 1/2016 | Thrasher et al. |
| 2016/0034775 A1 | 2/2016 | Meadow et al. |
| 2016/0055395 A1 | 2/2016 | Macciola et al. |
| 2016/0125613 A1 | 5/2016 | Shustorovich et al. |
| 2016/0171603 A1 | 6/2016 | Amtrup et al. |
| 2016/0217319 A1 | 7/2016 | Bhanu et al. |
| 2016/0350592 A1 | 12/2016 | Ma et al. |
| 2017/0024629 A1 | 1/2017 | Thrasher et al. |
| 2017/0046788 A1 | 2/2017 | Macciola et al. |
| 2017/0103281 A1 | 4/2017 | Amtrup et al. |
| 2017/0104885 A1 | 4/2017 | Amtrup et al. |
| 2017/0109576 A1 | 4/2017 | Shustorovich et al. |
| 2017/0109588 A1 | 4/2017 | Ma et al. |
| 2017/0109606 A1 | 4/2017 | Macciola et al. |
| 2017/0109610 A1 | 4/2017 | Macciola et al. |
| 2017/0109818 A1 | 4/2017 | Amtrup et al. |
| 2017/0109819 A1 | 4/2017 | Amtrup et al. |
| 2017/0109830 A1 | 4/2017 | Macciola et al. |
| 2017/0111532 A1 | 4/2017 | Amtrup et al. |

FOREIGN PATENT DOCUMENTS

| | | |
|---|---|---|
| EP | 3723247 A1 | 7/1996 |
| EP | 0767578 A2 | 4/1997 |
| EP | 3809219 A2 | 11/1997 |
| EP | 3843277 A2 | 5/1998 |
| EP | 0936804 A2 | 8/1999 |
| EP | 1054331 A2 | 11/2000 |
| EP | 1128659 A1 | 8/2001 |
| EP | 1317133 A1 | 6/2003 |
| EP | 1319133 A1 | 6/2003 |
| EP | 1422520 A1 | 5/2004 |
| EP | 1422920 A2 | 5/2004 |
| EP | 1956518 A1 | 8/2008 |
| EP | 1959363 A2 | 8/2008 |
| EP | 1976259 A1 | 10/2008 |
| EP | 2107480 A1 | 10/2009 |
| EP | 2472372 A1 | 7/2012 |
| JP | H07260701 A | 10/1995 |
| JP | H0962826 A | 3/1997 |
| JP | H09116720 A | 5/1997 |
| JP | H11118444 A | 4/1999 |
| JP | 2000067065 A | 3/2000 |
| JP | 2000103628 A | 4/2000 |
| JP | 2000354144 A | 12/2000 |
| JP | 2001309128 A | 11/2001 |
| JP | 2002024258 A | 1/2002 |
| JP | 2002519766 A | 7/2002 |
| JP | 2002312385 A | 10/2002 |
| JP | 2003091521 A | 3/2003 |
| JP | 2003196357 A | 7/2003 |
| JP | 2003234888 A | 8/2003 |
| JP | 2003303315 A | 10/2003 |
| JP | 2005018678 A | 1/2005 |
| JP | 2005085173 A | 3/2005 |
| JP | 2005173730 A | 6/2005 |
| JP | 2006031379 A | 2/2006 |
| JP | 2006209588 A | 8/2006 |

(56) References Cited

FOREIGN PATENT DOCUMENTS

| | | | |
|---|---|---|---|
| JP | 2006330863 A | 12/2006 | |
| JP | 200752670 A | 3/2007 | |
| JP | 2008134683 A | 6/2008 | |
| JP | 2011034387 A | 2/2011 | |
| JP | 2011055467 A | 3/2011 | |
| JP | 2012009033 A | 1/2012 | |
| JP | 2012517637 A | 8/2012 | |
| JP | 2013196357 A | 9/2013 | |
| JP | 5462286 B2 | 4/2014 | |
| TW | 401553 B | 8/2000 | |
| WO | 9604749 A1 | 2/1996 | |
| WO | 9847098 A1 | 10/1998 | |
| WO | 9967731 A1 | 12/1999 | |
| WO | 0263812 A2 | 8/2002 | |
| WO | 02063812 A2 | 8/2002 | |
| WO | 2004053630 A2 | 6/2004 | |
| WO | 2004056360 A1 | 7/2004 | |
| WO | 2006104627 A1 | 10/2006 | |
| WO | 2007081147 A1 | 7/2007 | |
| WO | 2007082534 A1 | 7/2007 | |
| WO | 2008008142 A2 | 1/2008 | |
| WO | 2010030056 A1 | 3/2010 | |
| WO | 2010056368 A1 | 5/2010 | |
| WO | 2010096192 A1 | 8/2010 | |

OTHER PUBLICATIONS

Final Office Action from U.S. Appl. No. 13/898,407, dated Jan. 13, 2014.
Notice of Allowance from U.S. Appl. No. 13/898,407, dated Apr. 23, 2014.
Non-Final Office Action from U.S. Appl. No. 14/340,460, dated Jan. 16, 2015.
Notice of Allowance from U.S. Appl. No. 14/340,460, dated Apr. 28, 2015.
Office Action from Japanese Patent Application No. 2014-552356, dated Jun. 2, 2015.
Office Action from Taiwan Application No. 102101177, dated Dec. 17, 2014.
Notice of Allowance from U.S. Appl. No. 14/220,023, dated Jan. 30, 2015.
Notice of Allowance from U.S. Appl. No. 14/220,029, dated Feb. 11, 2015.
International Search Report and Written Opinion from International Application No. PCT/US2013/021336, dated May 23, 2013.
Non-Final Office Action from U.S. Appl. No. 13/740,127, dated Oct. 27, 2014.
Notice of Allowance from U.S. Appl. No. 13/740,131, dated Oct. 27, 2014.
Final Office Action from U.S. Appl. No. 13/740,134, dated Mar. 3, 2015.
Non-Final Office Action from U.S. Appl. No. 13/740,134, dated Oct. 10, 2014.
Non-Final Office Action from U.S. Appl. No. 13/740,138, dated Dec. 1, 2014.
Notice of Allowance from U.S. Appl. No. 13/740,139, dated Aug. 29, 2014.
Notice of Allowance from U.S. Appl. No. 13/740,145, dated Mar. 30, 2015.
Non-Final Office Action from U.S. Appl. No. 13/740,145, dated Sep. 29, 2014.
Notice of Allowance from Taiwan Patent Application No. 102101177, dated Apr. 24, 2015.
Notice of Allowance from U.S. Appl. No. 13/740,138, dated Jun. 5, 2015.
Notice of Allowance from U.S. Appl. No. 13/740,127, dated Jun. 8, 2015.
Notice of Allowance from U.S. Appl. No. 14/569,375, dated Apr. 15, 2015.
Notice of Allowance from U.S. Appl. No. 13/740,134, dated May 29, 2015.
Notice of Allowability from U.S. Appl. No. 13/740,145, dated May 26, 2015.
Corrected Notice of Allowability from U.S. Appl. No. 13/740,138, dated Jul. 8, 2018.
Final Office Action from U.S. Appl. No. 13/740,134, dated Mar. 3, 3015.
Notice of Allowance from U.S. Appl. No. 14/804,276, dated Oct. 21, 2015.
Extended European Search Report from European Application No. 13738301.4, dated Nov. 17, 2015.
Notice of Allowance from U.S. Appl. No. 13/740,145, dated Jan. 15, 2016.
Office Action from Taiwan Patent Application No. 102101177, dated Dec. 17, 2014.
Non-Final Office Action from U.S. Appl. No. 13/740,141, dated Oct. 16, 2015.
Notice of Allowance from U.S. Appl. No. 13/740,145, dated Sep. 8, 2015.
Notice of Allowance from U.S. Appl. No. 14/334,558, dated Sep. 10, 2014.
Notice of Allowance from U.S. Appl. No. 13/740,123, dated Jul. 10, 2014.
Intsig Information Co., Ltd., "CamScanner," www.intsig.com/en/camscanner.html, retrieved Oct. 25, 2012.
Intsig Information Co., Ltd., "Product Descriptions," www.intsig.com/en/product.html, retrieved Oct. 25, 2012.
Extended European Search Report from European Application No. 14775259.6, dated Jun. 1, 2016.
Non-Final Office Action from U.S. Appl. No. 14/818,196, dated Aug. 19, 2016.
Final Office Action from U.S. Appl. No. 13/740,141, dated May 5, 2016.
Thrasher, C. W. et al., U.S. Appl. No. 15/214,351, filed Jul. 19, 2016.
Notice of Allowance from U.S. Appl. No. 13/740,141, dated Jul. 29, 2016.
International Search Report and Written Opinion from International Application No. PCT/US2016/043207, dated Oct. 21, 2016.
Non-Final Office Action from U.S. Appl. No. 14/927,359, dated Nov. 21, 2016.
International Search Report and Written Opinion from International Application No. PCT/US14/26569, dated Aug. 12, 2014.
Gllavata et al., "Finding Text in Images Via Local Thresholding," International Symposium on Signal Processing and Information Technology, Dec. 2003, pp. 539-542.
Zunino et al., "Vector Quantization for License-Plate Location and Image Coding," IEEE Transactions on Industrial Electronics, vol. 47, Issue 1, Feb. 2000, pp. 159-167.
International Search Report and Written Opinion from International Application No. PCT/US2014/057065, dated Dec. 30, 2014.
Non-Final Office Action from U.S. Appl. No. 14/932,902, dated Sep. 28, 2016.
Su et al., "Stereo rectification of calibrated image pairs based on geometric transformation," I. J. Modern Education and Computer Science, vol. 4, 2011, pp. 17-24.
Malis et al., "Deeper understanding of the homography decomposition for vision-based control," [Research Report] RR-6303, INRIA, Sep. 2007, pp. 1-90.
Notice of Allowance from U.S. Appl. No. 14/491,901, dated Aug. 4, 2015.
Final Office Action from U.S. Appl. No. 14/491,901, dated Apr. 30, 2015.
Mon-Final Office Action from U.S. Appl. No. 14/491,901, dated Nov. 19, 2014.
Mon-Final Office Action from U.S. Appl. No. 15/234,969, dated Nov. 18, 2016.
Amtrup, J. W. et al., U.S. Appl. No. 14/220,029, filed Mar. 19, 2014.
International Search Report and Written Opinion from PCT Application No. PCT/US15/26022, dated Jul. 22, 2015.
Non-Final Office Action from U.S. Appl. No. 14/588,147, dated Jun. 3, 2015.

(56) References Cited

OTHER PUBLICATIONS

Notice of Allowance from Japanese Patent Application No. 2014-005616, dated Jun. 12, 2015.
Office Action from Japanese Patent Application No. 2014-005616, dated Oct. 7, 2014.
Final Office Action from U.S. Appl. No. 14/588,147, dated Nov. 4, 2015.
Non-Final Office Action from U.S. Appl. No. 14/283,156, dated Dec. 1, 2015.
Notice of Allowance from U.S. Appl. No. 14/588,147, dated Jan. 14, 2016.
Non-Final Office Action from U.S. Appl. No. 14/804,278, dated Mar. 10, 2016.
Notice of Allowance from U.S. Appl. No. 14/283,156, dated Mar. 16, 2016.
Summons to Attend Oral Proceedings from European Application No. 10741580.4, dated Jun. 7, 2016.
Notice of Allowance from U.S. Appl. No. 14/078,402, dated Feb. 26, 2014.
Non-Final Office Action from U.S. Appl. No. 14/078,402, dated Jan. 30, 2014.
Notice of Allowance from U.S. Appl. No. 14/175,999, dated Aug. 8, 2014.
Non-Final Office Action from U.S. Appl. No. 14/175,999, dated Apr. 3, 2014.
Notice of Allowance from U.S. Appl. No. 13/802,226, dated Jan. 29, 2016.
Non-Final Office Action from U.S. Appl. No. 13/802,226, dated Sep. 30, 2015.
Final Office Action from U.S. Appl. No. 13/802,226, dated May 20, 2015.
Non-Final Office Action from U.S. Appl. No. 13/802,226, dated Jan. 8, 2015.
Non-Final Office Action from U.S. Appl. No. 14/209,825, dated Apr. 14, 2015.
Final Office Action from U.S. Appl. No. 14/209,825, dated Aug. 13, 2015.
Notice of Allowance from U.S. Appl. No. 14/209,825, dated Oct. 28, 2015.
International Search Report and Written Opinion from International Application No. PCT/US2014/026569, dated Aug. 12, 2014.
Gllavata, et al., "Finding Text in Images Via Local Thresholding," International Symposium on Signal Processing and Information Technology, Dec. 2003, pp. 539-542.
Zunino, et al., "Vector Quantization for License-Plate Location and Image Coding," IEEE Transactions on Industrial Electronics, vol. 47, Issue 1, Feb. 2000, pp. 159-167.
Bruns, E. et al., "Mobile Phone-Enabled Museum Guidance with Adaptive Classification," Computer Graphics and Applications, IEEE, vol. 28, No. 4, Jul.-Aug. 2008, pp. 98,102.
Tzotsos, A. et al., "Support vector machine classification for object-based image analysis," Object-Based Image Analysis, Springer Berlin Heidelberg, 2008, pp. 663-677.
Vailaya, A. et al., "On Image Classification: City Images vs. Landscapes," Pattern Recognition, vol. 31, No. 12, Dec. 1998, pp. 1921-1935.
Extended European Search Report from European Application No. 14773721.7, dated May 17, 2016.
Gonzalez, R. C. et al., "Image Interpolation", Digital Image Processing, Third Edition,2008, Chapter 2, pp. 65-68.
Kim, D. et al., "Location-based large-scale landmark image recognition scheme for mobile devices," 2012 Third FTRA International Conference on Mobile, Ubiquitous, and Intelligent Computing, IEEE, 2012, pp. 47-52.
Sauvola, J. et al., "Adaptive document image binarization," Pattern Recognition, vol. 33, 2000, pp. 225-236.
Tsai, C., "Effects of 2-D Preprocessing on Feature Extraction: Accentuating Features by Decimation, Contrast Enhancement, Filtering," EE 262: 2D Imaging Project Report, 2008, pp. 1-9.
Final Office Action from U.S. Appl. No. 14/804,278, dated Jun. 28, 2016.
International Search Report and Written Opinion from International Application No. PCT/US2014/065831, dated Feb. 26, 2015.
U.S. Appl. No. 61/780,747, filed Mar. 13, 2013.
U.S. Appl. No. 61/819,463, dated May 3, 2013.
Notice of Allowance from U.S. Appl. No. 14/268,876, dated Aug. 29, 2014.
Non-Final Office Action from U.S. Appl. No. 14/268,876, dated Jul. 24, 2014.
Non-Final Office Action from U.S. Appl. No. 14/473,950, dated Jan. 21, 2015.
Non-Final Office Action from U.S. Appl. No. 14/473,950, dated Feb. 6, 2015.
Final Office Action from U.S. Appl. No. 14/473,950, dated Jun. 26, 2015.
Notice of Allowance from U.S. Appl. No. 14/473,950, dated Sep. 16, 2015.
Non-Final Office Action from U.S. Appl. No. 14/981,759, dated Jun. 7, 2016.
Extended European Search Report from European Application No. 14861942.2, dated Nov. 2, 2016.
Non-Final Office Action from U.S. Appl. No. 15/191,442, dated Oct. 12, 2016.
Partial Supplementary European Search Report from European Application No. 14792188.6, dated Sep. 12, 2016.
Notice of Allowance from U.S. Appl. No. 14/981,759, dated Nov. 16, 2016.
Non-Final Office Action from U.S. Appl. No. 13/740,127, dated Feb. 23, 2015.
International Search Report and Written Opinion from International Application No. PCT/US2015/021597, dated Jun. 22, 2015.
U.S. Appl. No. 14/340,460, filed Jul. 24, 2014.
Requirement for Restriction from U.S. Appl. No. 14/177,136, dated Aug. 15, 2014.
International Search Report and Written Opinion from PCT Application No. PCT/US2014/036673, dated Aug. 28, 2014.
U.S. Appl. No. 14/473,950, filed Aug. 29, 2014.
Final Office Action from U.S. Appl. No. 14/176,006, dated Sep. 3, 2014.
Bishop, C.M., "Neural Networks for Pattern Recognition," Oxford University Press, Inc., 1995, p. 27.
Bishop, C.M., "Neural Networks for Pattern Recognition," Oxford University Press, Inc., 1995, pp. 77-85.
Bishop, C.M., "Neural Networks for Pattern Recognition," Oxford University Press, Inc., 1995, pp. 230-247.
Bishop, C.M., "Neural Networks for Pattern Recognition," Oxford University Press, Inc., 1995, pp. 295-300.
Bishop, C.M., "Neural Networks for Pattern Recognition," Oxford University Press, Inc., 1995, pp. 343-345.
Final Office Action from U.S. Appl. No. 14/220,023, dated Sep. 18, 2014.
International Search Report and Written Opinion from PCT Application No. PCT/US14/26597, dated Sep. 19, 2014.
U.S. Appl. No. 14/491,901, filed Sep. 19, 2014.
Final Office Action from U.S. Appl. No. 14/220,029, dated Sep. 26, 2014.
International Search Report and Written Opinion from PCT Application No. PCT/US14/36851, dated Sep. 25, 2014.
Notice of Allowance from U.S. Appl. No. 14/176,006, dated Oct. 1, 2014.
Non-Final Office Action from U.S. Appl. No. 11/752,691, dated Oct. 10, 2014.
Non-Final Office Action from U.S. Appl. No. 15/146,848, dated Dec. 6, 2016.
U.S. Appl. No. 15/389,342, filed Dec. 22, 2016.
U.S. Appl. No. 15/390,321, filed Dec. 23, 2016.
Final Office Action from U.S. Appl. No. 14/177,136, dated Nov. 4, 2016.
Non-Final Office Action from U.S. Appl. No. 14/177,136, dated Apr. 13, 2016.
Non-Final Office Action from U.S. Appl. No. 14/177,136, dated Dec. 29, 2014.

(56) References Cited

OTHER PUBLICATIONS

"Location and Camera with Cell Phones," Wikipedia, Mar. 30, 2016, pp. 1-19.
Non-Final Office Action from U.S. Appl. No. 14/176,006, dated Apr. 7, 2014.
Non-Final Office Action from U.S. Appl. No. 14/220,023, dated May 5, 2014.
Non-Final Office Action from U.S. Appl. No. 14/220,029, dated May 14, 2014.
International Search Report and Written Opinion from International Application No. PCT/US2016/043204, dated Oct. 6, 2016.
Final Office Action from U.S. Appl. No. 14/818,196, dated Jan. 9, 2017.
Decision to Refuse from European Application No. 10 741 580.4, dated Jan. 20, 2017.
Rainardi, V., "Building a Data Warehouse: With Examples in SQL Server," Apress, Dec. 27, 2007, pp. 471-473.
Office Action from Japanese Patent Application No. 2015-229466, dated Nov. 29, 2016.
Extended European Search Report from European Application No. 14792188.6, dated Jan. 25, 2017.
Non-Final Office Action from U.S. Appl. No. 15/394,719, dated Feb. 21, 2017.
Non-Final Office Action from U.S. Appl. No. 15/389,342, dated Mar. 10, 2017.
Notice of Allowance from U.S. Appl. No. 14/818,196, dated Mar. 16, 2017.
Office Action from Chinese Patent Application No. 201380004057.2, dated Feb. 27, 2017.
Non-Final Office Action from U.S. Appl. No. 14/932,902, dated Apr. 11, 2017.
Non-Final Office Action from U.S. Appl. No. 15/390,321, dated Mar. 17, 2017.
Notice of Allowance from U.S. Appl. No. 15/146,848, dated Apr. 13, 2017.
Notice of Allowance from U.S. Appl. No. 15/191,442, dated Apr. 24, 2017.
Final Office Action from U.S. Appl. No. 14/927,359, dated Apr. 28, 2017.
Notice of Allowance from U.S. Appl. No. 15/234,969, dated May 8, 2017.
Extended European Search Report from European Application No. 14881675.4, dated Jun. 7, 2017.
Corrected Notice of Allowance from U.S. Appl. No. 15/191,442, dated May 26, 2017.
Notice of Allowance from U.S. Appl. No. 15/394,719, dated Jun. 20, 2017.

\* cited by examiner

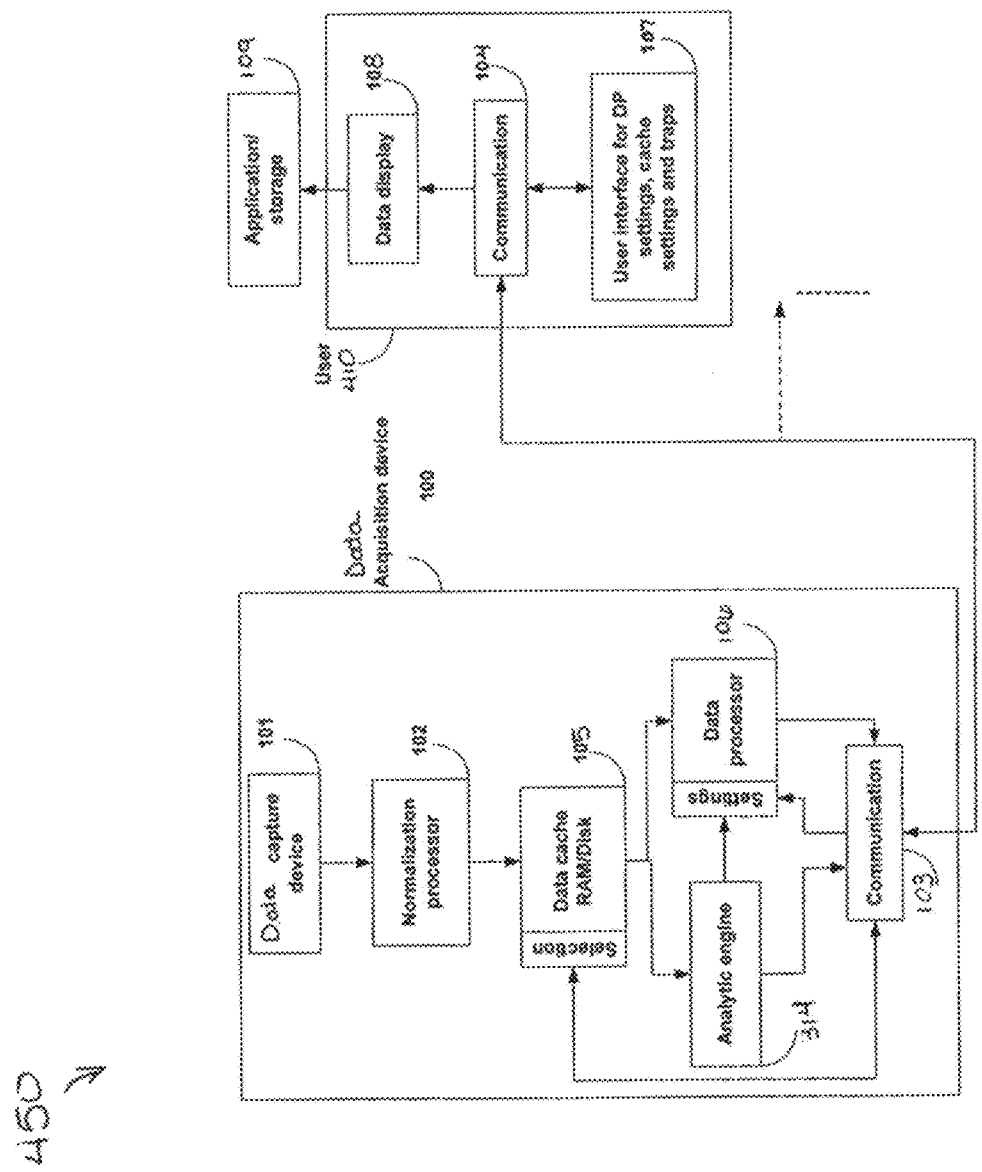

SYSTEMS AND METHODS OF PROCESSING SCANNED DATA

The present application claims the benefit of U.S. Provisional Application No. 62/194,783, filed Jul. 20, 2015 and is a continuation-in-part of U.S. application Ser. No. 14/266,671, filed Apr. 30, 2014, which is a continuation of U.S. application Ser. No. 11/329,999, filed Jan. 11, 2006, which claims the benefit of U.S. Provisional Application No. 60/665,067, filed Mar. 24, 2005, all of which are hereby incorporated herein by reference. This application is related to U.S. Pat. No. 9,058,515, granted Jun. 16, 2015; U.S. Pat. No. 8,885,229, granted Nov. 11, 2014; U.S. Pat. No. 8,855,375, granted Oct. 7, 2014; U.S. Pat. No. 8,345,981, granted Jan. 1, 2013; U.S. Patent Publication No. 2014/0270439, published Sep. 18, 2014; and U.S. Patent Publication No. 2014/0270536, published Sep. 18, 2014; each of which is herein incorporated by reference in its entirety.

BACKGROUND OF THE INVENTION

Field of the Invention

The present invention relates to systems and methods for improving the quality of data acquired by data acquisition devices. The user can be located locally or remotely from the data acquisition device.

Description of the Related Art

Data acquisition devices for analog data transform analog data to digital data. A typical example is a scanning device. It takes as input an image printed onto a sheet of paper and outputs a digital representation of the physical image. The quality obtained by the acquisition device depends strongly on using the device with settings that are suited for the specifics of the given analog data. For example, the scanner settings useful to achieve a high quality scanned image of a sunset are rather different from the settings used to scan a picture taken in the broad sunlight of a summer day. Finding better or optimal settings given the specifics of the analog data is a time consuming process that often makes it necessary to acquire the analog data more than once using different settings of the acquisition device. This becomes particularly unpractical and inefficient when the recipient of the digital data and the data acquisition device are at different locations.

The following example illustrates the inefficiency of the current technology. The recipient of a fax is unsatisfied with the quality of the received fax. In order to obtain a better quality fax, the recipient has to, e.g. by using a phone, inform a person located at the origination of the fax and request to resend the fax with different settings.

Furthermore, given temporary analog data, the determination of improved acquisition settings using physical reacquisition of the analog data is either impossible or less feasible within a narrow time frame.

In current remote data acquisition applications, analog data are acquired digitally by using, for example, a scanning device or a digital copy machine. The digitalized data are then sent to a remote recipient via a network. Current methods of remote digital acquisition application do not provide the remote recipient of the acquired data with remote control of the data acquisition device.

SUMMARY OF THE INVENTION

Embodiments include methods of virtual reacquisition of data for the purpose of quality enhancements. In an embodiment, virtual reacquisition for quality enhancement may be used for scanning devices, and other data acquisition devices, such as, for example, digital copiers, fax machines, multifunctional peripherals, infrared cameras, acoustic cameras, digital cameras, infrared cameras, acoustic cameras, digital cameras, mobile phones with built in digital cameras, and the like. Virtual reacquisition can be used with any analog or digital source including, for example, voice, acoustic measurements for monitoring devices, temperature, video, and the like.

The input stream of an acquisition device for analog data can be either discrete or continuous. In addition, the input stream can be a function of time or space. Regardless of these modalities, the resulting data are contained in an ordered set of discrete units. The order of the set contains the information of the time or space direction of the input stream. In case of a continuous input stream, the acquisition device generates discrete units by subdividing the continuous input stream in bins. For example, the input to a video camera is continuous, and the resulting data are given by the ordered set of picture frames taken by the camera with each picture frame being an instance of the aforementioned discrete units. A batch of paper sheets fed into a scanning device is an example of a discrete input stream, and the discrete data are defined by the paper sheets.

One embodiment is an efficient method and system for enhancing the digital data obtained by an acquisition device for analog data. The enhancements are obtained using virtual reacquisition of the analog data. The method of virtual reacquisition stores the raw data acquired by the acquisition device in a cache. The data processor accesses the raw data from the cache allowing the reprocessing of the raw data by the data processor without physically reacquiring the data by the acquisition device.

An embodiment stores as many of the incoming data units at the cache as possible, given the cache size. In certain embodiments, new storage for incoming data is created by deleting the data units that have resided at the cache the longest. In addition, or in other embodiments, data units are assigned priorities and data units with lower priorities are overwritten with new data units before data units with higher priorities.

An embodiment has the capability of virtually reacquiring the most current or more currently used data units acquired by the acquisition device. Alternatively, the user can, via a selection mechanism, virtually reacquire the raw data or subsections of the raw data stored at the cache. The method of virtual reacquisition renders unnecessary the time and labor consuming physical reacquisition of the analog data. Furthermore, in instances where physical reacquisition of the data is impossible, e.g. in the case of a time dependent input stream, the application of virtual reacquisition is especially valuable.

An additional application of virtual reacquisition is given when the acquisition rate of the acquisition device is too high for the output communication system and as default, compressed low resolution data are transferred. Using virtual reacquisition the recipient of the data can selectively access and reprocess the original high-resolution data despite the constraint given by the bandwidth of the transmission.

In addition, an embodiment of the method and system presented here utilizes virtual reacquisition to efficiently determine improved or optimal acquisition device settings. The improved or optimal settings can be found interactively in real time as well as in non-real time, automatically by the system itself, or using a combination thereof, depending on the specific embodiment. Furthermore, the method and system facilitates the control of digital acquisition devices by alerting the user automatically about potentially low quality digital data or changes in the input stream, that might be of interest to the user, by analyzing the data and comparing the results against some user defined thresholds. This feature is of value, for example, in deployments using or requiring the acquisition of large amounts of analog data.

In addition, the method of virtual reacquisition in combination with remote deployment", as presented in an embodiment, offers the potential of large efficiency gains in a large variety of business processes, e.g. security surveillance applications. For example, a building is monitored using a video system and, owing to the available bandwidth, as low resolution data are transmitted to a central location. By analyzing the data, the system detects events that are potentially of interest for the person monitoring the system and triggers the transmission of high resolution data to the user utilizing virtual reacquisition.

By transferring as default the processed data instead of the raw uncompressed data, the remote application of an embodiment makes efficient use of storage and of the network reducing or minimizing the hardware usage or requirements on storage as well as the network.

Furthermore, an embodiment of the method and system presented here allows multiple users to share the usage of one or multiple analog acquisition devices. Each user can process the same raw data with different setting of the data processor enabling each individual user to process the raw data according to his or her personal preferences and needs.

Finally, an embodiment of the method and system can be independently applied to subsections of the acquired discrete data units, i.e. the user can select subsections of the acquired data unit and process the selected subsections differently. For example, given a scanned image displaying an image and text, the user can subdivide the acquired data unit in two zones with one containing the image and the other text and can virtual reacquire the zones using settings most suited or better suited for the selected zone.

As mentioned above, an embodiment of the method and system presented here has the capability of determining improved or optimal processor settings automatically by deploying potentially one or more analytic engines. For example, a first analytic engine (engine 1) takes as input the raw data, whereas a second analytic engine (engine 2) uses the processed data as input. The second engine determines the quality of the processed data using a metric. It selects new processor settings either randomly or depending on the quality of the processed data as determined by the metric. The raw data are reprocessed using the new settings. This process continues until convergence, i.e. until the metric cannot detect any improvements in the quality of the processed data. The functions performed by the first analytic engine are, but are not limited to, page boundaries detection, background smoothing; bleed-through detection, color detection, and orientation detection, and the like.

Page boundaries detection is useful for efficient page skew correction. In an embodiment, the page boundaries detection detects the page against a variety of backgrounds and, thus, allows page skew correction and cropping for white background scanners as well as black background scanners.

An embodiment of a background smoothing method addresses the need or desire to reduce the number of colors within the backgrounds of an image to improve the appearance of the image as well as decrease the size of the image after compression. An embodiment of the method works as follows. Cluster all or a portion of the colors found in the image and select those that contain enough pixels to be considered backgrounds. These backgrounds are then merged, and all or a portion of the pixels within the image belonging to a background cluster are replaced by the average color within the cluster.

An embodiment of the bleed-through detection detects bleed-through on otherwise blank sides of scanned documents in order to perform further image processing on these pages. An embodiment of this algorithm uses page boundary detection within front and back scanned images to approximately match side coordinates. Then, the algorithm uses existing color or gray content to fine-tune the mapping. This additional step is useful because of slightly different optics and skews of front and back cameras. If residual (unexplained) content fall below certain density criterion, the page is called blank.

In an embodiment, the color detection addresses the need or desire to detect the color content in a scanned image and the need or desire to distinguish between the foreground and background color. An embodiment of this algorithm provides a mechanism to eliminate the background color if it is a predominant color or the most predominant color in the document. An embodiment of this algorithm examines pixels in the scanned image and determines if they are a color pixel or a background pixel. This determination uses the saturation and luminance levels of the pixel.

In an embodiment, orientation detections determine automatically which way to orthogonally rotate a text page for viewing. An embodiment of the algorithm selects possible individual characters from connected components of black within the page and determines their individual orientations by a trained neural network. The algorithm uses the orientation results as votes to decide which orientation of the page is best or an improvement.

In an embodiment, virtual reacquisition is implemented as software and is independent from the acquisition device. The users of the acquisition device can interactively enhance the quality of the digital representation of the acquired analog data by changing the processor settings. The possible adjustments include, but are not limited to, brightness, contrast, gamma, erosion, orientation, segmentation, color rendering, saturation, resolution, warping angle, out of sequence detection, dilation, speckle removal, and skew angle. The embodiment is of value, for example, in connection with acquisition devices that, owing to their limited hardware capabilities, are generally incapable of producing consistently high quality digital data given, as input, a large variety of analog data. In these instances, the embodiment is a cost effective method to enhance the capabilities and usability of the acquisition device.

Furthermore, an embodiment allows the users of the acquisition device to acquire the digital data according to their individual preferences and requirements.

Another advantage, in an embodiment, is virtual reacquisition's independence from the acquisition device. The algorithms employed by virtual reacquisition typically progress on a considerably faster pace than the improvements to the hardware of the acquisition devices. The user can easily take advantage of the algorithmic improvements by simply updating the virtual reacquisition software. This feature is of value, for example, for expensive high-end scanners by reducing or minimizing the scanners depreciation.

In a further embodiment, the embodiments described above are deployed remotely and, thus, offers the capabilities of virtual reacquisition to one or more remote recipients of the digital data. The implementation may be software, firmware, hardware, or any combination of software, firmware, or hardware.

An example of an embodiment is within the usage of fax server machines. The data are rendered in high definition analog form, stored at the data cache of the fax communication server, and the binary data, obtained by using default settings and attributes, are sent to their respective destinations. Through a call back protocol, implemented at the fax server machine, the recipient of the fax can select a specific image or a scaled area of an image from the images stored at the fax server and specify the processor settings and attributes for the selected image. The selected image or scaled area of the image is reprocessed according to the specified settings and transmitted to the recipient.

Image sets are stored in the cache at the fax server. When the cache is full or when the image is fully processed by the user, the images are either erased, replaced by the transmitted image, stored in a database, or any combination thereof. This embodiment enables the recipient of the fax to enhance the quality of the received fax directly on his desktop or application, rendering obsolete the resending of the fax in case of insufficient image quality.

In addition, the above-mentioned call back protocol allows the recipient to alert the sender to irreversible potential problems such as, white pages. Finally, the sender does not have to guess improved or optimal settings while sending the fax.

In a further embodiment, virtual reacquisition is enhanced by an analytic engine that takes as input the raw data of the acquisition device. The analytic engine automatically determines improved or close to optimal settings for the acquisition device. Additionally, it automatically monitors the quality of the digital data obtained by the acquisition device and alerts the user when the quality is below a predetermined threshold. The user can adjust the threshold to his or her preferences. In addition, the user can overwrite the acquisition device settings determined by the analytic engine and interactively adjust the settings manually when necessary or desired.

In an embodiment, the interactive adjustments can be done in non-real-time, and thus, do not interrupt the flow of incoming data. This embodiment is of interest, for example, for deployments that use or require the acquisition of large amounts of analog data. It allows a nearly automatic data acquisition and still ensures high quality of the resulting digital data. Typical examples are copier rooms or facilities that electronically archive large amounts of paper documents using scanning devices.

In an embodiment, virtual reacquisition enhanced by an analytic engine may be implemented as software, firmware, hardware, or any combination of software, firmware, or hardware. The hardware implementation offers advantages with regard to speed compared to the software implementation and allows handling high volumes of data fast and efficient.

In a further embodiment, the virtual reacquisition enhanced by the analytic engine is deployed remotely. Remotely deployed virtual reacquisition enhanced by an analytic engine may be implemented as software, firmware, hardware, or any combination of software, firmware, or hardware.

In a further embodiment, the virtual reacquisition is enhanced by a first and a second analytic engine. The second analytic engine analyzes the processed digital data obtained with specific data processor settings from the first analytic engine. Utilizing this information, the second analytic engine estimates a new set of data processor settings and the raw data are virtually reacquired using the new settings.

In an embodiment, this process is iterated until sufficiently improved settings or the optimal settings have been determined automatically. Virtual reacquisition enhanced by a first and a second analytic engine may be implemented as software, firmware, hardware, or any combination of software, firmware, or hardware.

In a further embodiment, virtual reacquisition enhanced by a first and a second analytic engine is deployed remotely. Remotely deployed virtual reacquisition enhanced by a first and a second analytic engine may be implemented as software, firmware, hardware, or any combination of software, firmware, or hardware.

In an embodiment, a data processing system comprises raw or normalized data from a data capture device, where the raw or normalized data is stored in a computer accessible storage medium, and a first acquisition controller in communication with the raw or normalized data. The first acquisition controller is configured to analyze at least portions of the raw or normalized data to determine whether the raw or normalized data is within a first set of parameters. If the raw or normalized data is not within the first set of parameters, the first acquisition controller generates a first set of processor settings. The data processing system further comprises a processor in communication with the first acquisition controller, where the processor is configured to process the raw or normalized data with the first set of processor settings, and a second acquisition controller in communication with the processor. The second image acquisition controller is configured to analyze at least portions of the processed data to determine whether the processed data is within a second set of parameters. If the processed data is not within the second set of parameters, the second acquisition controller generates a second set of processor settings that the processor uses to reprocess the raw or normalized data.

In another embodiment, a data processing method comprises storing raw or normalized data from a data capture device in a computer accessible storage medium, and analyzing at least portions of the raw or normalized data with a first analytic engine to determine whether the raw or normalized data is within a first set of parameters. If the raw or normalized data is not within the first set of parameters, the method comprises generating with the first analytic engine a first set of processor settings, processing the raw or normalized data with the first set of processor settings, and analyzing at least portions of the processed data with a second analytic engine to determine whether the processed data is within a second set of parameters. If the processed data is not within the second set of parameters, the method further comprises generating with the second analytic engine a second set of processor settings to reprocess the raw or normalized data.

In yet another embodiment, a data processing system comprises a storing means for storing raw data from a data capture device, a first analyzing means in communication with the raw data for analyzing at least portions of the raw data to determine whether the raw data is within a first set of parameters, and if not, the first analyzing means generates a first set of processor settings. The data processing system further comprises a processing means in communication with the first analyzing means for processing the raw data with the first set of processor settings, and a second analyzing means in communication with the processing means for analyzing at least portions of the processed data to determine whether the processed data is within a second set of parameters, and if not, the second analyzing means generates a second set of processor settings that the processing means uses to reprocess the raw data.

In a further embodiment, a document processing system comprises document data from a data capture device where the document data is stored in a computer accessible storage medium, and a first acquisition controller in communication with the document data. The first acquisition controller is configured to analyze at least portions of the document data to determine whether the 'document data is within a first set of parameters. If the document data is not with the first set of parameters, the first acquisition controller generates a first set of processor settings. The document processing system further comprises a processor in communication with the first acquisition controller, where the processor is configured to process the document data with the first set of processor settings, and a second acquisition controller in communication with the processor. The second acquisition controller is configured to analyze at least portions of the processed document data to determine whether the processed document data is within a second set of parameters. If the processed document data is not within the second set of parameters, the second acquisition controller generates a second set of processor settings that the processor uses to reprocess the document data.

In an embodiment, a document processing method comprises storing document data from a data capture device in a computer accessible storage medium, and analyzing with a first analytic engine at least portions of the document data to determine whether the document data is within a first set of parameters. If the document data is not within the first set of parameters, the method further comprises generating with the first analytic engine a first set of processor settings, processing the document data with the first set of processor settings, and analyzing with a second analytic engine at least portions of the processed document data to determine whether the processed document data is within a second set of parameters. If the processed document data is not within the second set of parameters, the method further comprises generating with the second analytic engine a second set of processor settings to reprocess the document data.

In another embodiment, a document processing system comprises a storing means for storing document data from a data capture device, a first analyzing means in communication with the document data for analyzing at least portions of the document data to determine whether the document data is within a first set of parameters, and if not, the first analyzing means generates a first set of processor settings. The document processing system further comprises a processing means in communication with the first analyzing means for processing the document data with the first set of processor settings, a second analyzing means in communication with the processing means for analyzing at least portions of the processed document data to determine whether the processed document data is within a second set of parameters, and if not, the second analyzing means generates a second set of processor settings that the processing means uses to reprocess the document data.

In yet another embodiment, a document processing system comprises a random access cache that receives a document from a scanner, where the document is stored as multiple bands within the random access cache and in a manner that is randomly accessible. The document processing system further comprises a processor in communication with the random access cache, where the processor is configured to obtain the document from the random access cache, the processor having processor control settings that are used to process the document, and an acquisition controller interconnected with the processor. The acquisition controller is configured to analyze the processed document to determine when to use different processor control settings on at least one band within the document and where the processor randomly accesses the at least one band stored in the random access cache to reprocess the band with the different processor control settings.

In a further embodiment, a document processing method comprises storing a document from a scanner as multiple bands within a random access cache and in a manner that is randomly accessible, obtaining the document from the random access cache, and processing the document with processor control settings. The method further comprises analyzing the processed document with an analytic engine to determine when to use different processor control settings on at least one band within the document, and randomly accessing the at least one band stored in the random access cache to reprocess the band with the different processor control settings.

In an embodiment, a document processing system comprises a storing means for storing a document received from a scanner as multiple bands within the storing means and in a manner that is randomly accessible, and a processing means for obtaining the document from the storing means and processing the document with processor control settings associated with the processing means. The document processing system further comprises an analyzing means for analyzing the processed document to determine when to use different processor control settings on at least one band within the document, and an accessing means for randomly accessing the at least one band stored in the storing means to reprocess the band with the different processor control settings.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIG. 4 is a block diagram of a hardware-implemented embodiment of a data acquisition and rescanning system having an analytic engine.

FIG. 12-1 illustrates a network architecture, in accordance with one embodiment.

FIG. 12-2 shows a representative hardware environment that may be associated with the servers and/or clients of FIG. 12-1, in accordance with one embodiment.

FIG. 12-3 a portion of a driver's license in a color rendition, according to one embodiment.

FIG. 12-4 depicts the same portion of the driver's license, appearing in a grayscale rendition of the color image shown in FIG. 12-3, according to one embodiment.

FIG. 12-5A-FIG. 12-5D depicts a plurality of binary images generated using a plurality of different thresholds, according to one embodiment.

FIGS. 12-6A and 12-6B depict a composite image generated by extracting high-confidence characters from the plurality of thresholded images shown in FIG. 12-5A-FIG. 12-5D.

DETAILED DESCRIPTION OF THE PREFERRED EMBODIMENT

Figure 1:
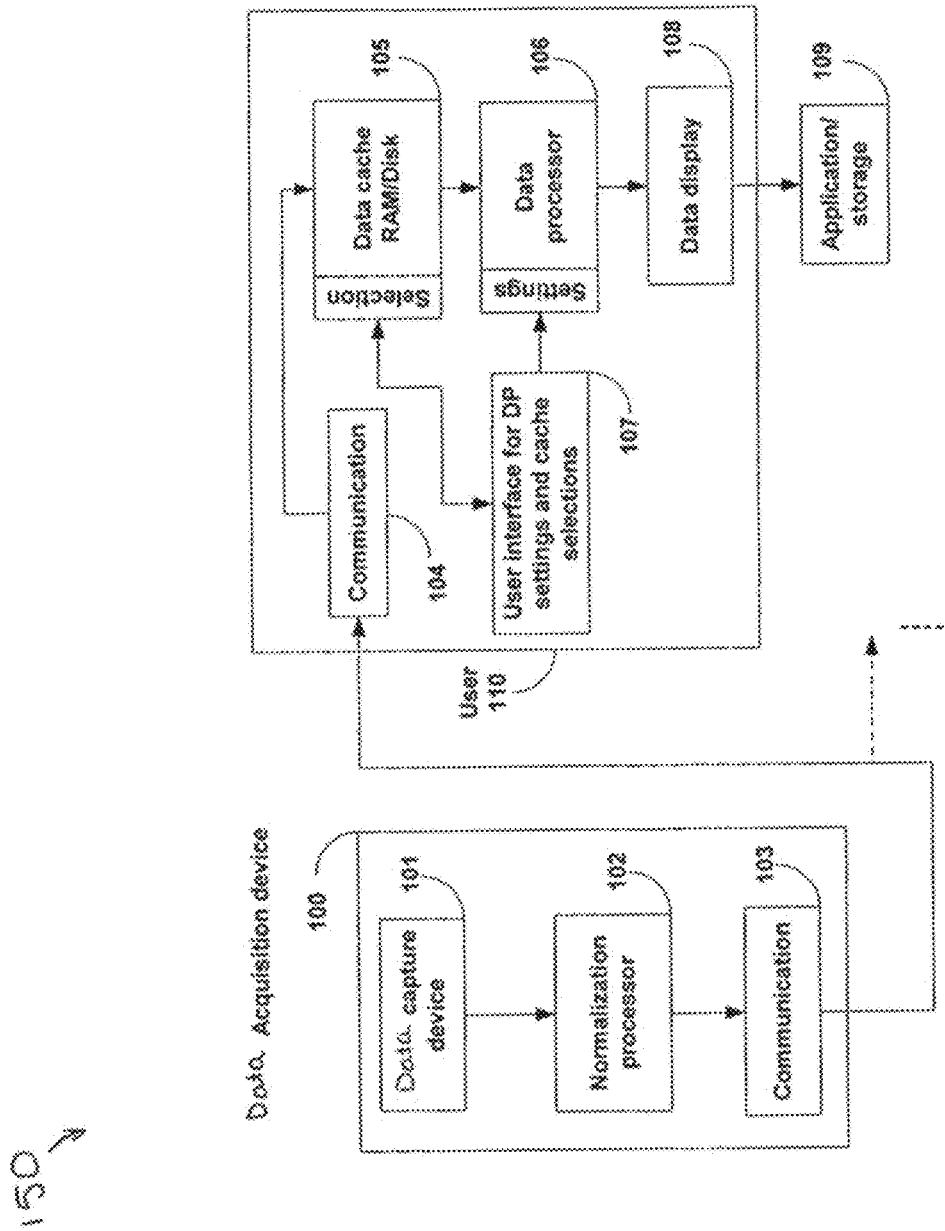
FIG. 1 is a block diagram of an embodiment of a data acquisition and rescanning system.

FIG. 1 is a block diagram of an embodiment of a data acquisition and rescanning system 150. The data acquisition and rescanning system 150 comprises a data acquisition device 100, which comprises a data capture device 101, a normalization processor 102, and a communication device 103. Examples of data capture devices 101 include, but are not limited to scanners, cameras, video recorders, infrared cameras, acoustic cameras, digital cameras, facsimile machines, any devices capable of capturing an image, acoustic sensors, any devices having an acoustic sensor, and the like. Data capture devices 101 can be non-real time devices, such as, for example, scanners, or data capture devices 101 can be real time devices, such as, for example, cameras and video recorders.

The data acquisition and rescanning system 150 further comprises a user system 110, which comprises a communication device 104, which communicates with the communication device 103, a random access data cache 105, a data processor 106, a user interface 107, and a data display 108. In an embodiment, the random access data cache stores the data in at least one subsection, zone, band, image strip, data strip, or the like, and in a manner that is randomly accessible.

The data reacquisition and rescanning system 150 further comprises an application/storage device 109. Examples of the application/storage device 109 include, but are not limited to computer processors, program logic, controller circuitry, general purpose single-chip or multi-chip microprocessors, digital Signal processors, embedded microprocessors, microcontrollers and the like. Data storage examples can include volatile and non-volatile memory, hard drives, DVD storage, CD ROM storage, optical and magneto-optical storage, removable or non-removable flash memory devices, or another memory device.

Analog data are presented to the acquisition device 100. The analog capture device 101 measures the analog data. The normalization processor 102 transforms the measured data into normalized data. It calibrates and compensates for known errors and biases introduced by the sensors measuring the analog data to produce normalized data.

The normalized raw data, referred to as raw data from here on, are transmitted via a fast connection using the communication devices 103 and 104 to the user system 110 and stored at the random access data cache 105. The raw data are stored as bands, image strips, data strips, or the like in the random access cache 105. In an embodiment, the random access data cache 105 is partitioned into 64 K byte bands.

In addition to the raw data, data pertaining to the raw data, or metadata for each band, are also stored at the cache 105. These metadata comprise, but are not limited to, a tag identifying the data and the location in the cache, a time and date stamp of the acquisition, the sequence number, the beginning of the data band, the end of the data band, height, width, a pointer to the next band, and the like. In some embodiments, tags identify subsections or zones of raw data.

The data processor 106 processes the raw data using the default data processor settings.

The order in which the raw data are processed by the data processor 106 is either determined automatically or interactively. In an automatic embodiment, the most current or more current raw data first stored at the cache 105 are processed.

In an interactive embodiment, the user identifies specific raw data bands or subsections of these for processing utilizing the data tags or metadata. The bands are randomly accessible in the cache 105. This allows non real-time virtual reacquisition.

The processed data together with their metadata are displayed at the data display 108. The default data processor settings are adjustable through the user interface 107. Changing the settings triggers the data processor 106 to reprocess the selected raw data stored in the random access data cache 105 with the changed settings and to display the reprocessed data at the data display 108. By interactively readjusting the processor settings, the data are processed until they satisfy the user's preferences.

In addition to controlling the data processor 106, the user interface 107 also controls the random access data cache 105. The user, through the user interface 107, can access subsections, zones, bands, image strips, or data strips of the raw data as well as selecting specific raw data for non-real time interactive processing.

The user can transmit the processed data to the application/storage device 109 for further processing as well as storage.

The data acquisition and rescanning system 150 depicted in FIG. 1 supports multiple user usage. The data acquisition device 100 can be accessed by multiple users. In an embodiment, the user system 110 further comprises a computer (not shown). In an embodiment, the user system 110 is implemented, at least in part, as software on the computer.

Figure 2:
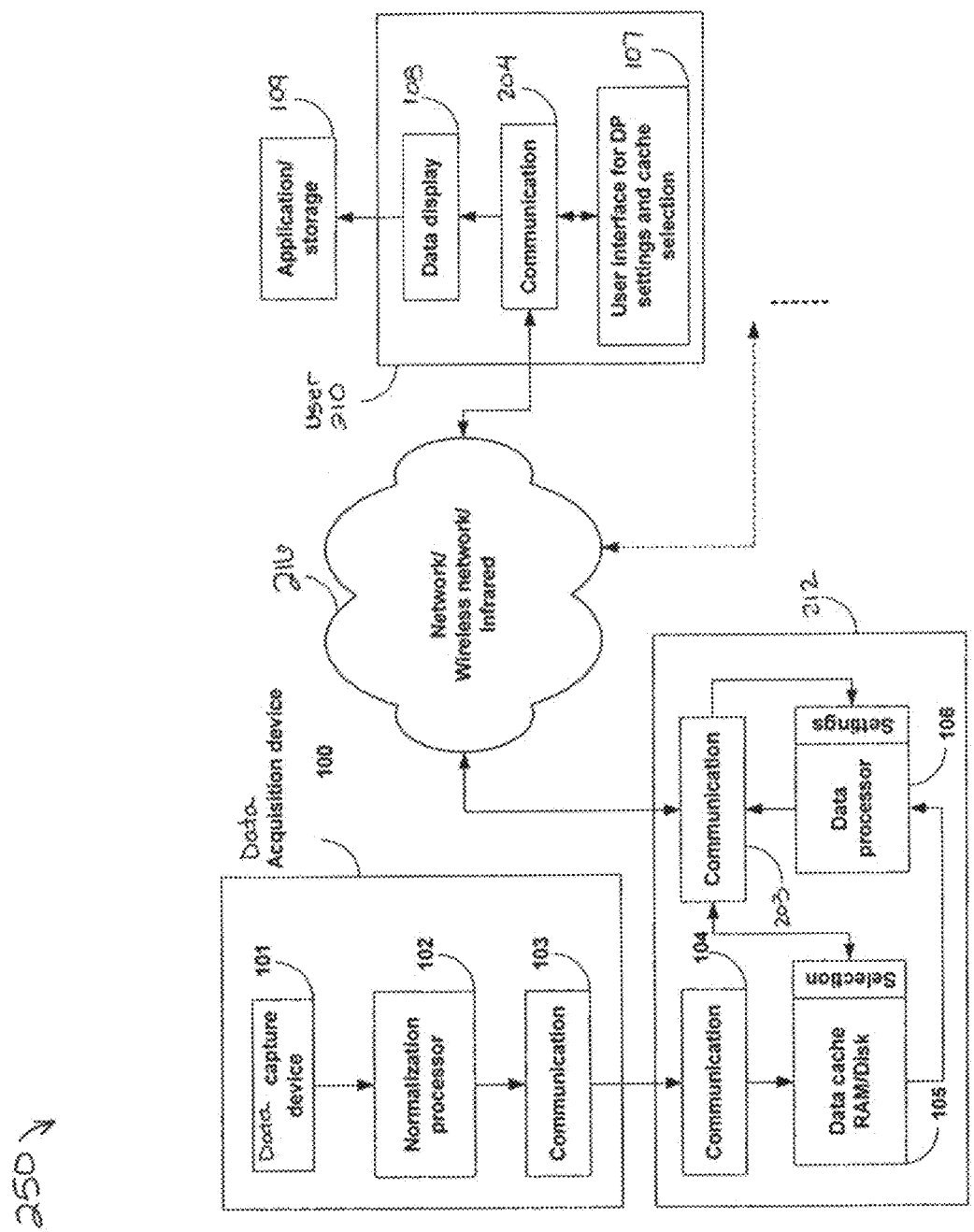
FIG. 2 is a block diagram of an embodiment of a remotely deployed data acquisition and rescanning system.

FIG. 2 is a block diagram of an embodiment of a remotely deployed data acquisition and rescanning system 250. The data acquisition and rescanning system 250 comprises the data acquisition device 100, a storage and processing system 212, a user system 210, and the acquisition/storage device 109.

The storage and processing system 212 comprises the communication device 103, the random access data cache 105, the data processor 106, and a communication device 203.

The user system 210 comprises a communication device 204, the user interface 107, and the data display 108.

The raw data from the acquisition device 100 are transmitted, via a fast connection using the communication devices 103 and 104, to the storage and processing system 212. The raw data and the metadata are stored at the random access data cache 105. The data processor 106 processes the raw data using the default data processor settings.

The user system 210 communicates with the storage and processing system 212 via a communication medium 216 using the communication devices 203 and 204.

Focusing now on the communication medium 216, as shown in FIG. 2, in one embodiment, the communications medium is Internet, which is a global network of computers. In other embodiments, the communication medium 216 can be any communication system including by way of example, dedicated communication lines, telephone networks, wireless data transmission systems, infrared data transmission systems, two-way cable systems, customized computer networks, interactive kiosk networks, and the like.

The processed data together with their metadata are displayed at the data display 108. The default data processor settings are adjustable through the user interface 107. Changing the settings triggers the data processor 106 to reprocess the selected raw data stored in the random access data cache 105 with the changed settings and to display the reprocessed data at the data display 108. By interactively readjusting the processor settings, the data are processed until they satisfy the user's preferences.

The user can transmit the processed data to the application/storage device 109 for further processing as well as storage.

The data acquisition and rescanning system 250 is similar to the data acquisition and rescanning system 150 except the user system 210 is located remotely from the data acquisition device 100 and the storage and processing system 212. In the remotely deployed system 250, the data cache 105 is local to the data acquisition device 100. The user system 210 does not have to be connected to the data acquisition device 100 with a fast connection in order to ensure an effective use of the embodiment. The data acquisition and rescanning system 250 is implemented, at least in part, as software, firmware, or any combination of software and firmware.

Figure 3:
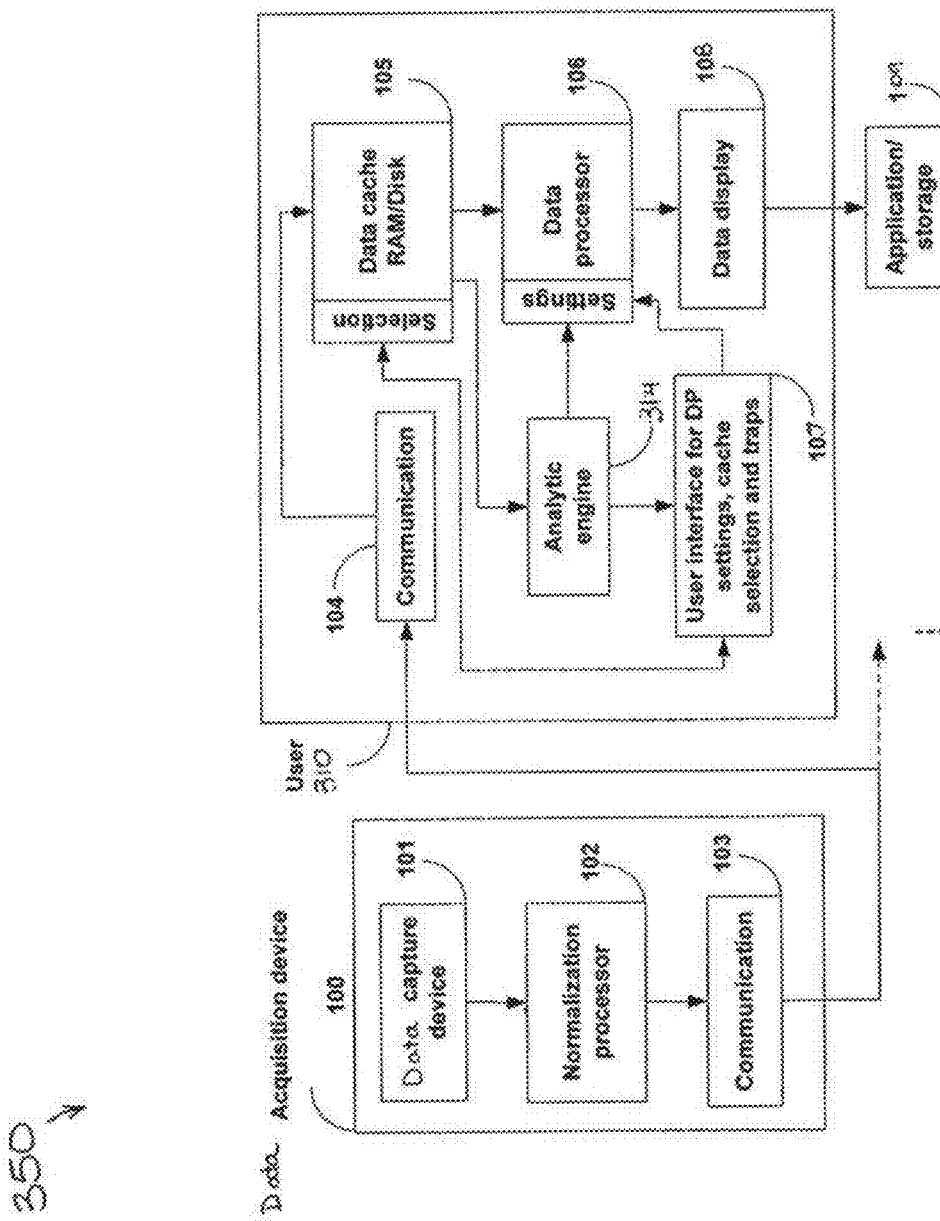
FIG. 3 is a block diagram of an embodiment of a data acquisition and rescanning system having an analytic engine.

FIG. 3 is a block diagram of an embodiment of a data acquisition and rescanning system 350 comprising an analytic engine. The data acquisition and rescanning system 350 comprises the data acquisition device 100, a user system 310, and the application/storage device 109. The user system 310 comprises the communication device 104, the random access data cache 105, the data processor 106, the user interface 107, the data display 108, and an analytic engine 314.

Analog data are presented to the acquisition device 100. The analog capture device 101 measures the analog data. The normalization processor 102 transforms the measured data into normalized raw data. The raw data are transmitted via a fast connection using the communication devices 103 and 104 to the user system 310. At the user system 310, the raw data are stored at the random access data cache 105.

Selected raw data are analyzed by the analytic engine 314. In an embodiment, the analytic engine 314 is an acquisition controller 314. The selection mechanism can be either automatic or interactive as described in the embodiments above. The analysis performed by the analytic engine 314 yields new data processor settings for the selected raw data. Examples of analyses comprise, but are not limited to, page boundary detection, streak detection, page border detection, blank page detection, conversion from RGB color representation to a YCbCr color representation, hue measurement, saturation measurement, luminescence measurement, creating a grayscale intensity histogram, creating a color histogram, geometric analysis, color detection, gamma detection for brightness and color levels, textual orientation, and the like.

The settings are transferred to the data processor 106, and the raw data are processed with the new settings. The processed data are displayed at the data display 108. The data processor settings can be adjusted interactively using the user interface 107. In addition to determining the data processor settings, the analytic engine 314 also detects automatically raw data that will potentially result in poor quality processed data and alerts the user upon selection of these data through the user system 310. The corresponding trapping conditions (e.g., user-defined parameters specifying quality thresholds such as brightness range, contrast range, missing corner, blank page, and the like) are accessible to the user through the user interface 107. The user through the user system 310 is able to control the quality of the acquired data.

The user system 310 can transmit the processed data to the application/storage device 109 for further processing as well as storage. Additionally the user can, via the user interface 107, access subsections, or zones of the raw data stored at the random access data cache 105 to be processed at the data processor 106.

The data acquisition and rescanning system 350 allows the non real time interactive processing of specific raw data. The data acquisition and rescanning system 350 also supports multiple user usage. The data acquisition device 100 can be accessed by multiple user systems 310 with each data processor 106 having unique processor settings. In an embodiment, the data acquisition and rescanning system 350 further comprises a computer (not shown). In an embodiment, the data acquisition and rescanning system 350 is implemented, at least in part, as software on the computer.

Figures 1, 12:
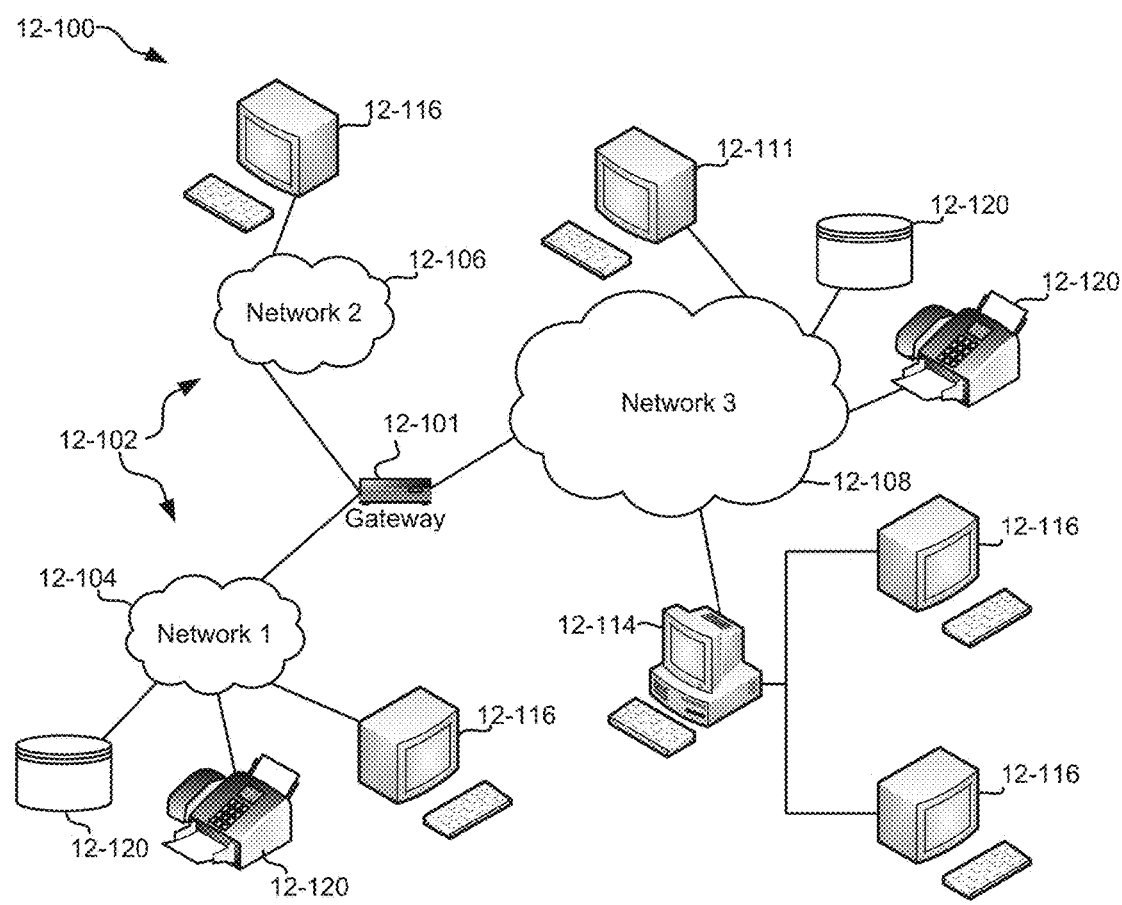
Figures 2, 12:
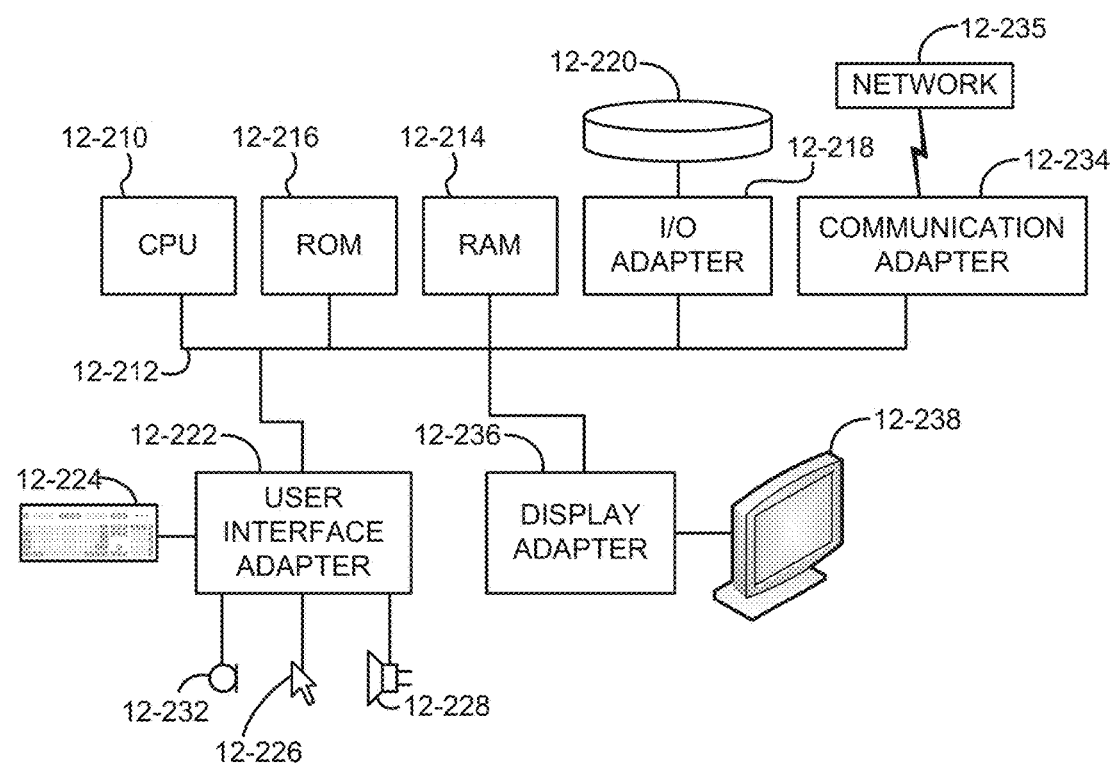
Figures 3, 12:
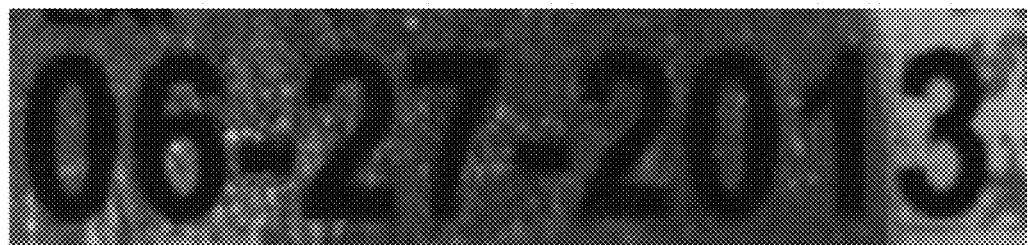
Figures 4, 12:
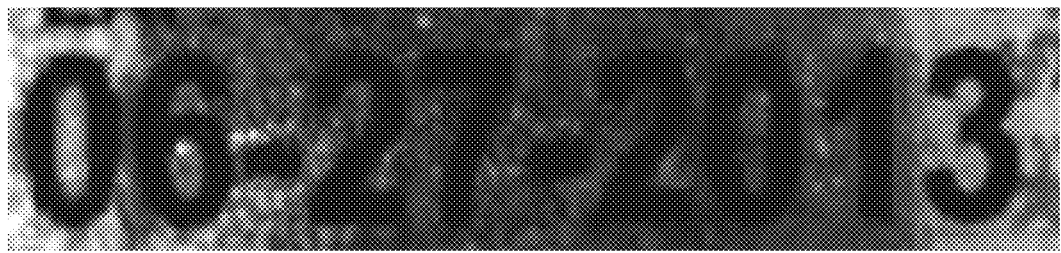
Figures 5A, 12:
Figures 5B, 12:
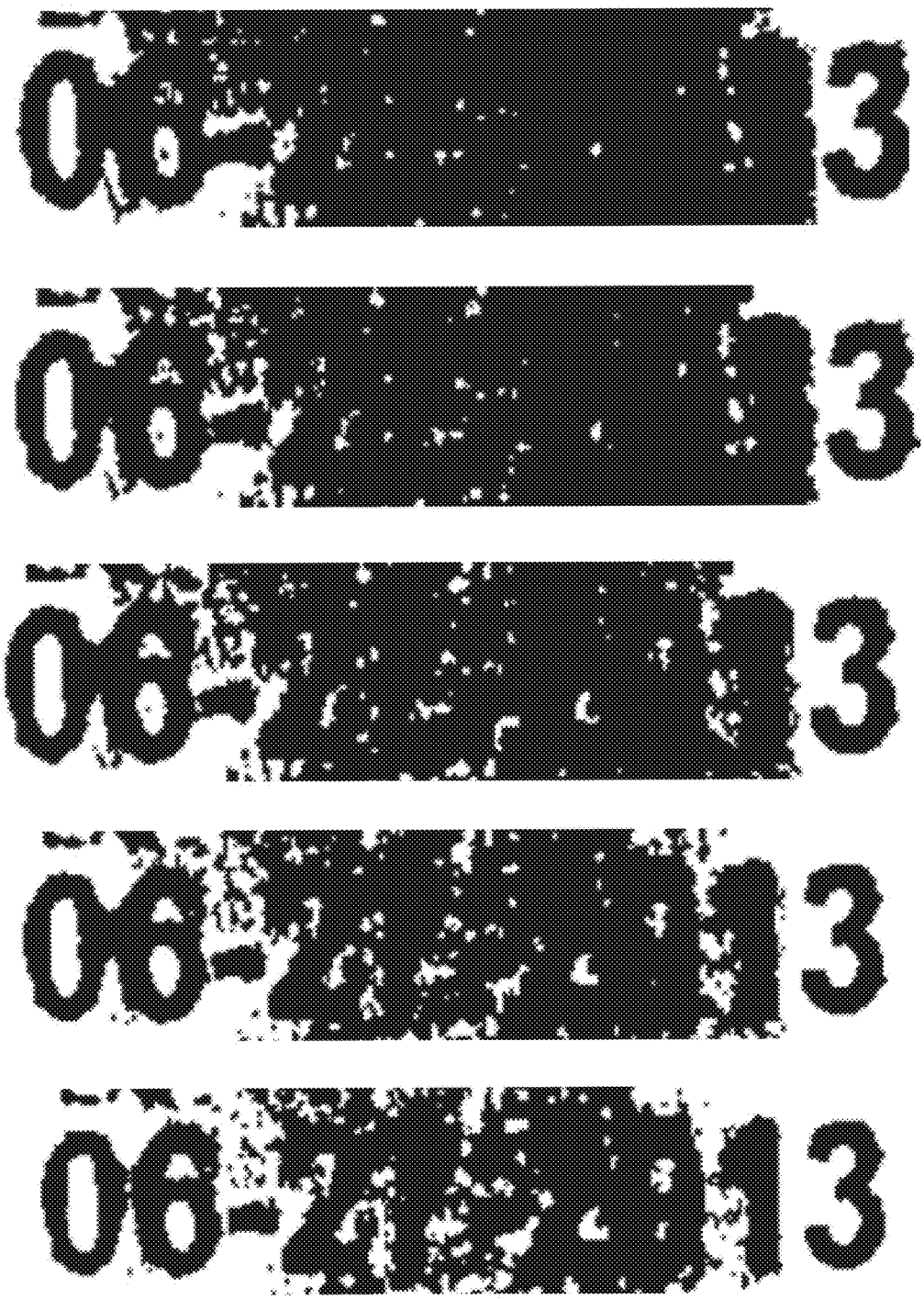

FIG. 4 is a block diagram of an embodiment of a data acquisition and rescanning system 450 comprising the data acquisition device 100, a user system 410, and the analytic engine 314. The data acquisition and rescanning system 450 implements the data acquisition and rescanning system 350 shown in FIG. 3 as hardware.

The random access data cache 105, the data processor 106, and the analytic engine 314 are implemented at the data acquisition device 100. The data acquisition device 100 further comprises the data capture device 101, the normalization processor 102, and the communication device 103. The user system 410 comprises the communication device 104, the user interface 107, and the data display 108.

Figure 5:
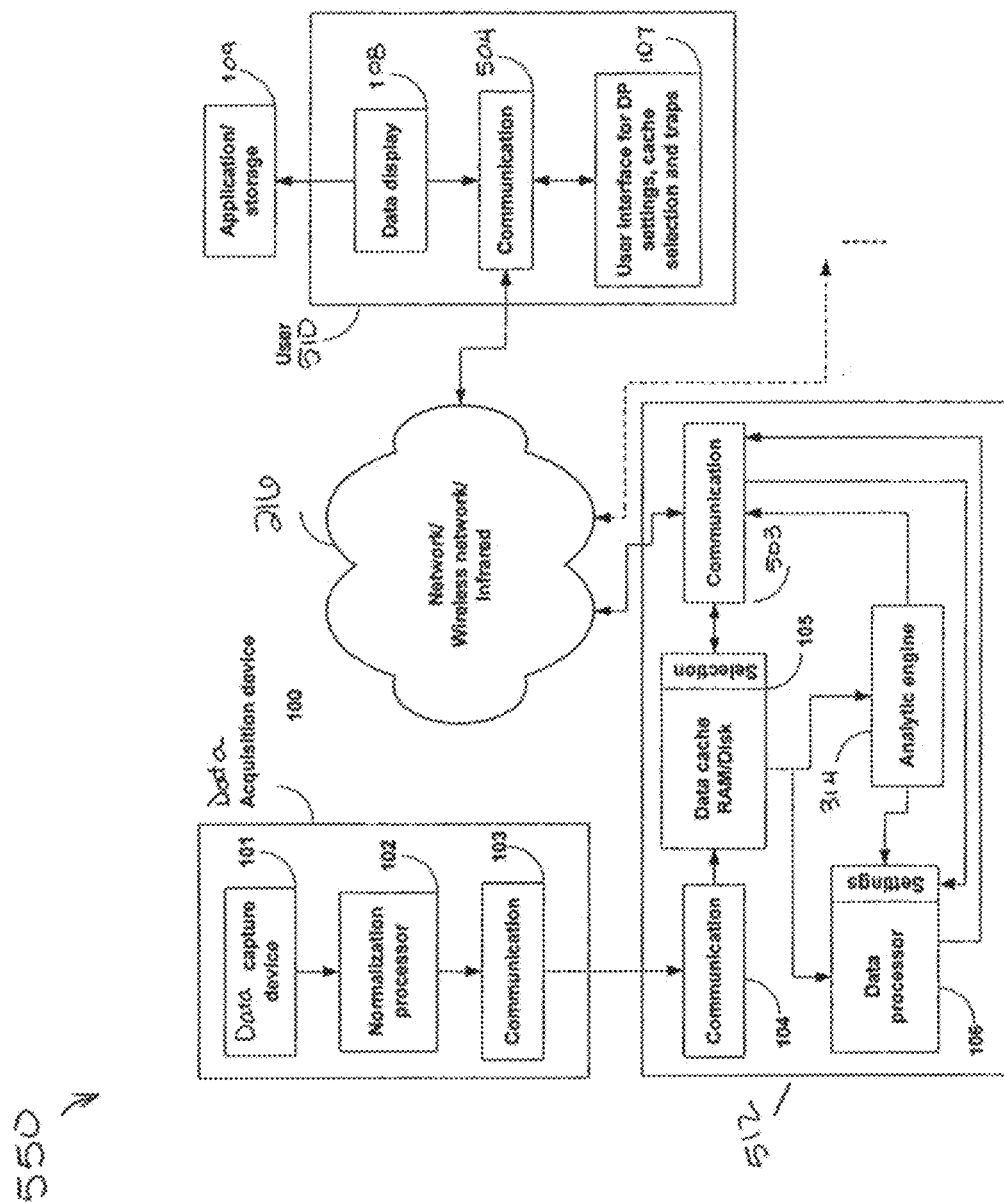
FIG. 5 is a block diagram of an embodiment of a remotely deployed data acquisition and rescanning system having an analytic engine.

FIG. 5 is a block diagram of an embodiment of a remotely deployed data acquisition and rescanning system 550 comprising the analytic engine 314. The data acquisition and rescanning system 550 comprises the data acquisition device 100, a storage and processing system 512, a user system 510, and the acquisition/storage device 109.

The storage and processing system 512 comprises the communication device 104, the random access data cache 105, the data processor 106, the analytic engine 314, and a communication device 503.

The user system 510 comprises a communication device 504, the user interface 107, and the data display 108.

The raw data from the acquisition device 100 are transmitted, via a fast connection using the communication devices 103 and 104, to the storage and processing system 512. The raw data and the metadata are stored at the cache 105. The data processor 106 processes the raw data using the default data processor settings.

Selected raw data are analyzed by the analytic engine 314. The analysis performed by the analytic engine 314 yields new data processor settings for the selected raw data. The settings are transferred to the data processor 106, and the raw data are processed with the new settings.

The user system 510 communicates with the storage and processing system 512 via the communication medium 216 using the communication devices 503 and 504. The processed data are displayed at the data display 108. The data processor settings can be adjusted interactively using the user interface 107.

The user, through the user system 510, can transmit the processed data to the application/storage device 109 for further processing as well as storage. Additionally the user can, via the user interface 107, access subsections, or zones of the raw data stored at the random access data cache 105 to be processed at the data processor 106.

The data acquisition and rescanning system 550 allows the non real time, interactive processing of specific raw data. The data acquisition and rescanning system 550 is similar to the data acquisition and rescanning system 350 except the user system 510 is located remotely from the data acquisition device 100 and the storage and processing system 512. In the remotely deployed system 550, the data cache 105 and the analytic engine 314 are local to the data acquisition device 100.

The data acquisition and rescanning system 550 also supports multiple user usage. The data acquisition device 100 can be accessed by multiple user systems 510 with each data processor 106 having unique processor 'settings. The data acquisition and rescanning system 550 is implemented, at least in part, as software, firmware, or a combination of software and firmware.

Figure 6:
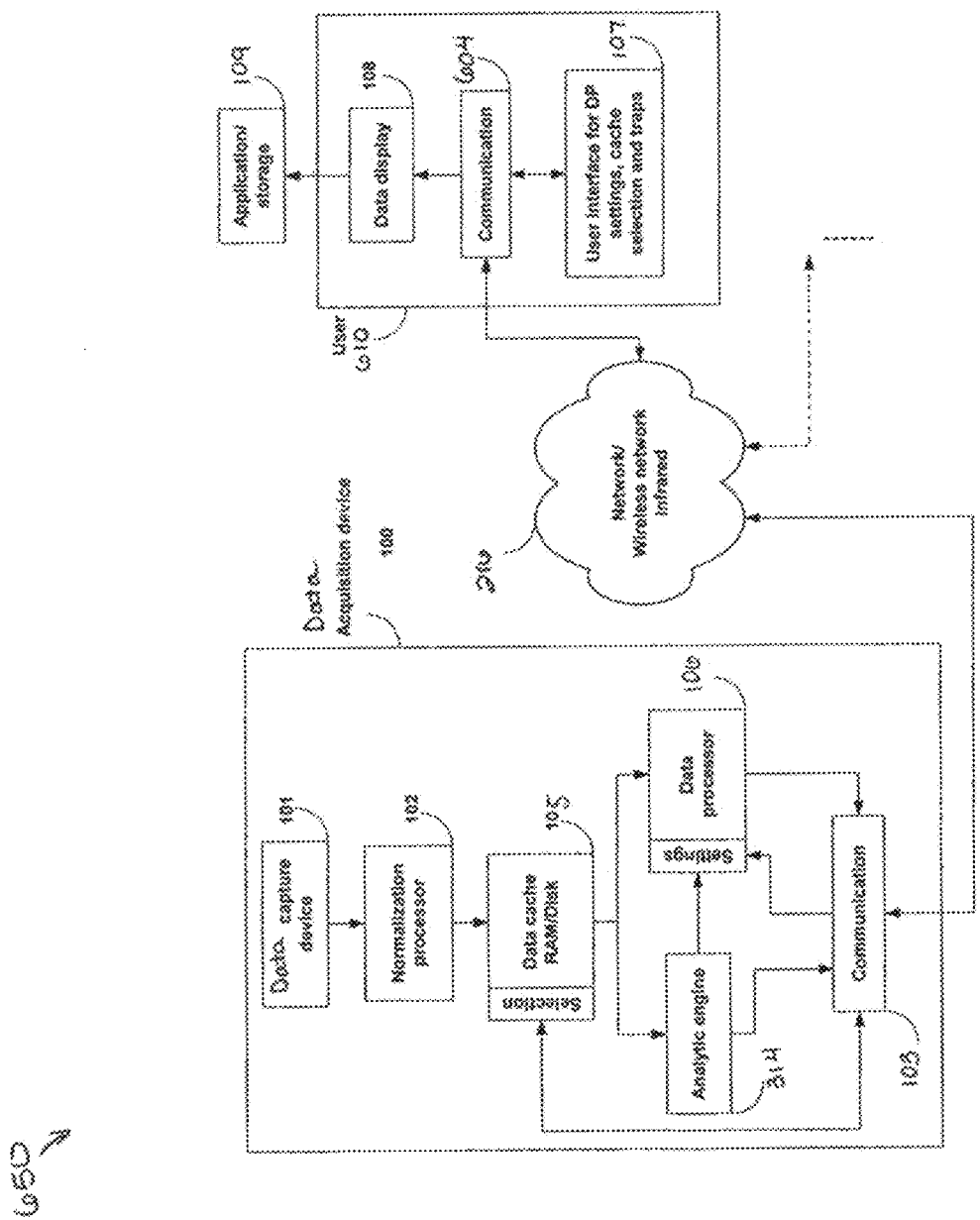
FIG. 6 is a block diagram of a hardware-implemented embodiment of a remotely deployed data acquisition and rescanning system having an analytic engine.

FIG. 6 is a block diagram of a hardware implemented embodiment of a remotely deployed data acquisition and rescanning system 650 comprising the analytic engine 314. The data acquisition and rescanning system 650 implements the data acquisition and rescanning system 450 shown in FIG. 4 in a remote deployment. The data acquisition and rescanning system 650 comprises the data acquisition device 100, a user system 610, and the application/storage device 109.

The random access data cache 105, the data processor 106, and the' analytic engine 314 are implemented as hardware on the data acquisition device 100 directly. The data acquisition device 100 further comprises the data capture device 101, the normalization processor, and the communication device 103. The user system 610 comprises the user interface 107, the data display 108, and a communication device 604.

The user system 610 communicates with the data acquisition device 100 via the communication medium 216 using the communication devices 103 and 604.

Figure 7:
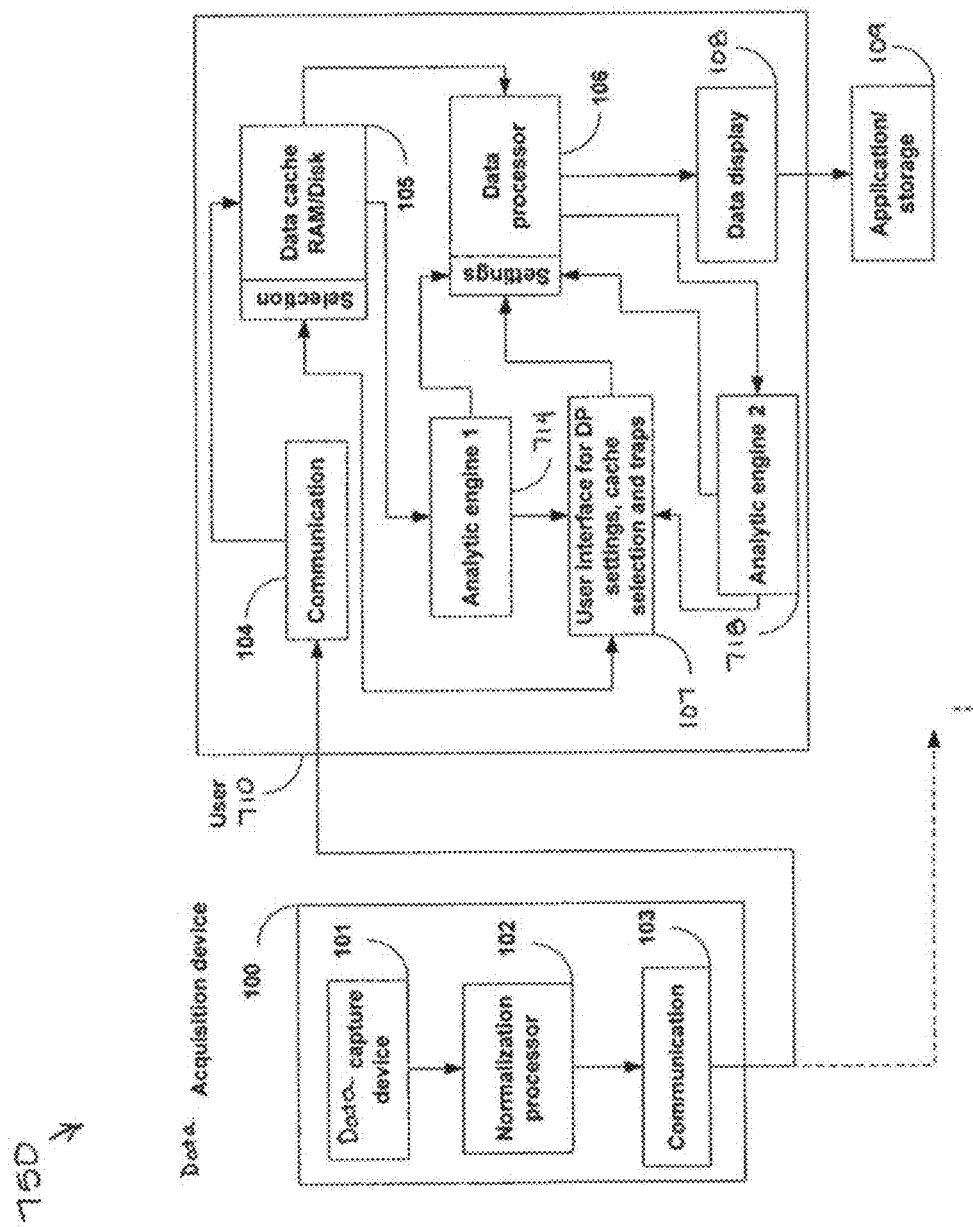
FIG. 7 is a block diagram of an embodiment of a data acquisition and rescanning system having a first and a second analytic engine.

FIG. 7 is a block diagram of an embodiment of a data acquisition and rescanning system 750 having a first analytic engine 714 and a second analytic engine 718. The data acquisition and rescanning system 750 comprises the data acquisition device 100 and a user system 710. The data acquisition device 100 comprises the data capture device 101, the normalization processor 102, and the communication device 103. The user system 710 comprises the communication device 104, the random access data cache 105, the data processor 106, the user interface 107, and the data display 108. The user system 710 further comprises the first analytic engine 714 and the second analytic engine 718. In an embodiment, the first and second analytic engines 714, 718 are first and second acquisition controllers 714,718, respectively.

Analog data are presented to the acquisition device 100. The data capture device 101 measures the analog data. The normalization processor 102 transforms the measured data into normalized raw data. The raw data are transmitted via a fast connection using the communication devices 103 and 104 to the user system 710.

At the user system 710, the raw data are stored at the data cache 105. The raw data are stored as bands, image strips, data strips, or the like in the random access data cache 105. In an embodiment, the random access data cache is partitioned in to 64 K byte bands.

In addition to the raw data, data pertaining to the raw data, or metadata for each band, are also stored at the cache 105. These metadata comprise, but are not limited to, a tag identifying the data and the location in the cache, a time and date stamp of the acquisition, the sequence number, the beginning of the data band, the end of the data band, height, width, a pointer to the next band, and the like. In some embodiments, tags identify subsections or zones of raw data.

Selected raw data are analyzed by the first analytic engine 714. The selection mechanism can be either automatic or interactive as described in the embodiments above. The analysis performed by the first analytic engine 714 yields an improved or close to optimal data processor settings for the selected raw data. In an embodiment, the first analytic engine 714 performs geometric processing, such as for example, document orientation, background compensation, color compensation, text extraction, text/background separation, page boundary detection, streak detection, page border detection, blank page detection, conversion from RGB color representation to a YCbCr color representation, hue measurement, saturation measurement, luminescence measurement, creating a grayscale intensity histogram, creating a color histogram, color detection, gamma detection for brightness and color levels, and the like.

The settings are transferred to the data processor 106, and the raw data are processed given with the settings.

The processed data are transferred to the second analytic engine 718. In an embodiment, the processor 106 sends the processed data to the second analytic engine 718 for analysis. In another embodiment, the processor 106 sends the processed data to the first analytic engine 714 and the first analytic engine 714 sends the processed data to the second analytic engine 718 for analysis.

At the second analytic engine 718 the processed data are analyzed and improved data processor settings are determined. The second analytic engine 718 compares the quality of the processed data to a predetermined metric. The second analytic engine 718 selects new processor settings based on the quality of the processed data as determined by the metric.

In an embodiment, the second analytic engine performs feature or quality processing, such as, for example, recognizing an area of poor optical character recognition, nonlinear gamma, high background noise, character color distortion, and the like. In an embodiment, the second analytic engine replaces, at least in part, the user's data review at the data display 108 and the user's revised processor settings input from the user interface 107.

The new settings are transmitted to the data processor 106 and the raw data are reprocessed using the new settings. In an: embodiment, the second analytic engine 718 sends the metadata containing the location of the raw data in the random access cache 105 and the new processor settings to the processor 106. The processor 106 processes the data with the new processor settings.

In another embodiment, the second analytic engine 718 sends the metadata associated with the data and the new processor settings to the first analytic engine 714. The first analytic engine 714 receives the metadata containing the location of the raw data in the random access cache 105 and the new processor settings and sends the metadata containing the location of the raw data in the random access cache 105 and the new processor settings to the processor 106. The processor processes the raw data with the new processor settings.

In yet another embodiment, the second analytic engine 718 sends the metadata associated with the data to the first analytic engine 714. The first analytic engine 714 receives the metadata containing the location of the raw data in the random access cache 105 and the new processor settings and processes the band of raw data with the new processor settings.

The processed data are transferred to the second analytic engine 718 for analysis. In an embodiment, the processor 106 sends the processed data to the second analytic engine 718 for analysis. In another embodiment, the first analytic engine 714 sends the processed data to the second analytic engine 718 for analysis. In another embodiment, the processor 106 sends the processed data to the first analytic engine 714 and the first analytic engine 714 sends the processed data to the second analytic engine 718 for analysis.

The step of reprocessing the raw data with the revised data processor settings and the step of analyzing the processed data and determining revised data processor settings are repeated until convergence, i.e. until the metric does not detect any improvements in the quality of the processed data. This yields improved or optimal processor settings.

For example, a scanner scans a document at a resolution of 600 dots per inch (dpi). The document includes text of various font sizes. The raw data are stored in the random access cache 105 in bands, along with the metadata associated with each band of raw data.

To save processing time and user storage space, the first analytic engine 714 sends the processor 106 settings to process the data at a resolution of 200 dpi, for example, along with other possible geometric processing settings, as described above.

The processor 106 processes the raw data using the settings from the first analytic engine 714. The processed data and the associated metadata are transferred to the second analytic engine 718.

The second analytic engine 718 analyzes the processed data using a predefined metric. For example, the second analytic engine 718 determines that a band of the processed data is not recognizable, perhaps because the text size is too small to be recognizable at a resolution of 200 dpi. The second analytic engine 718 sends the metadata associated with the band of unrecognizable data along with new processor setting to process the data at a resolution of 400 dpi to the processor 106.

The processor 106 receives the metadata containing the location of the raw data in the random access cache 105 and the new processor settings and processes the band of raw data at 400 dpi. The processor 106 sends the processed band of data and its associated metadata to the second analytic engine 718 for analysis.

The second analytic engine 718 determines if the processed band of data meets the predetermined metric. If not, the second analytic engine 718 sends the metadata associated with the band along with new processor settings to process the band of raw data to the processor 106. For example, the second analytic engine 718 determines that the text in the band is unrecognizable even at a resolution of 400 dpi and sends the metadata associated with the band along with new processor settings to process the band of raw data at a resolution of 600 dpi to the processor 106.

The process of analyzing the data and reprocessing the raw data with new processor setting occurs until the second analytic engine 718 determines that the processed data meet the predefined metric. Processing parameters can be changed on portions or bands of the raw data without reprocessing all of the raw data. In an embodiment, reprocessing portions of the captured data saves processing time and data storage space.

The processed data obtained by these steps are displayed at the data display 108. The data processor settings can be adjusted interactively using the user interface 107.

In addition to determining the data processor settings, the first analytic engine 714 and the second analytic engine 718 automatically detect raw data that will potentially result in poor quality processed data. The corresponding trapping conditions, described above, are accessible to the user through the user interface 107, enabling the user to efficiently control the quality of the acquired data.

Additionally the user can, via the user interface 107, access subsections or zones of the raw data stored at the random access data cache 105 to be processed at the data processor 106.

The data acquisition and rescanning system 750 also allows the non real time interactive processing of specific raw data. The user can transmit the processed data to the application/storage device 109 for further processing as well as storage. The data acquisition and rescanning system 750 supports multiple user usage. The acquisition device 100 can be accessed by multiple user systems 710 with each data processor 106 having unique processor settings. In an embodiment, the data acquisition and rescanning system 750 further comprises a computer (not shown). In an embodiment, the data acquisition and rescanning system 750 is implemented, at least in part, as software on the computer.

Figure 8:
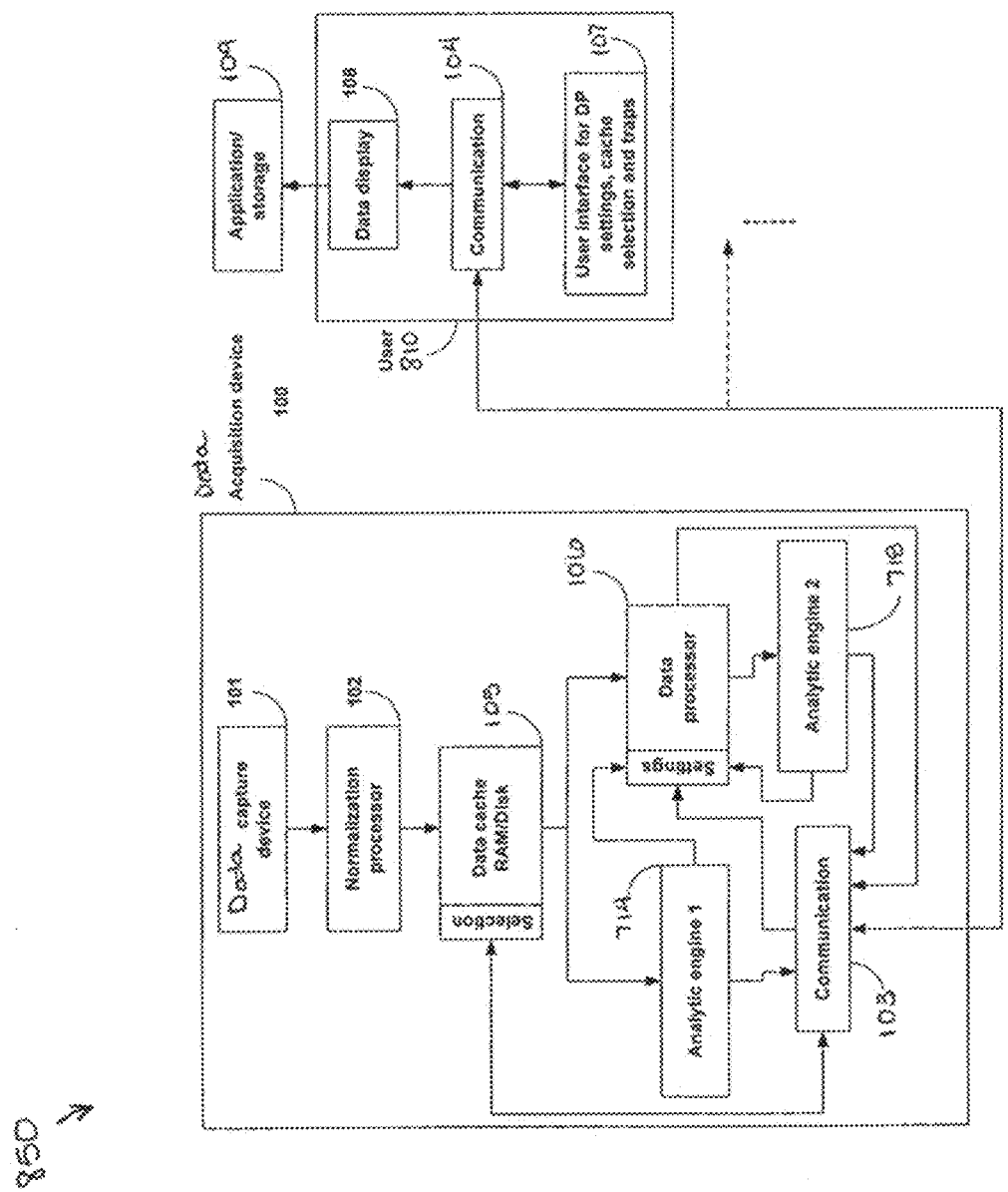
FIG. 8 is a block diagram of a hardware implemented embodiment of a data acquisition and rescanning system having a first and a second analytic engine.

FIG. 8 is a block diagram of an embodiment of a data acquisition and rescanning system 850 comprising the first analytic engine 714 and the second analytic engine 718. The data acquisition and rescanning system 850 implements the data acquisition and rescanning system 750 shown in FIG. 7 as hardware.

The data acquisition and rescanning system 850 comprise the data acquisition device 100, a user system 810, and the application/storage device 109. The random access data cache 105, the data processor 106, the first analytic engine 714, and the second analytic engine 718 are implemented at the data acquisition device 100. The data acquisition device 100 further comprises the data capture device 101, the normalization processor 102, and the communication device 103. The user system 810 comprises the communication device 104, the user interface 107, and the data display 108.

Figure 9:
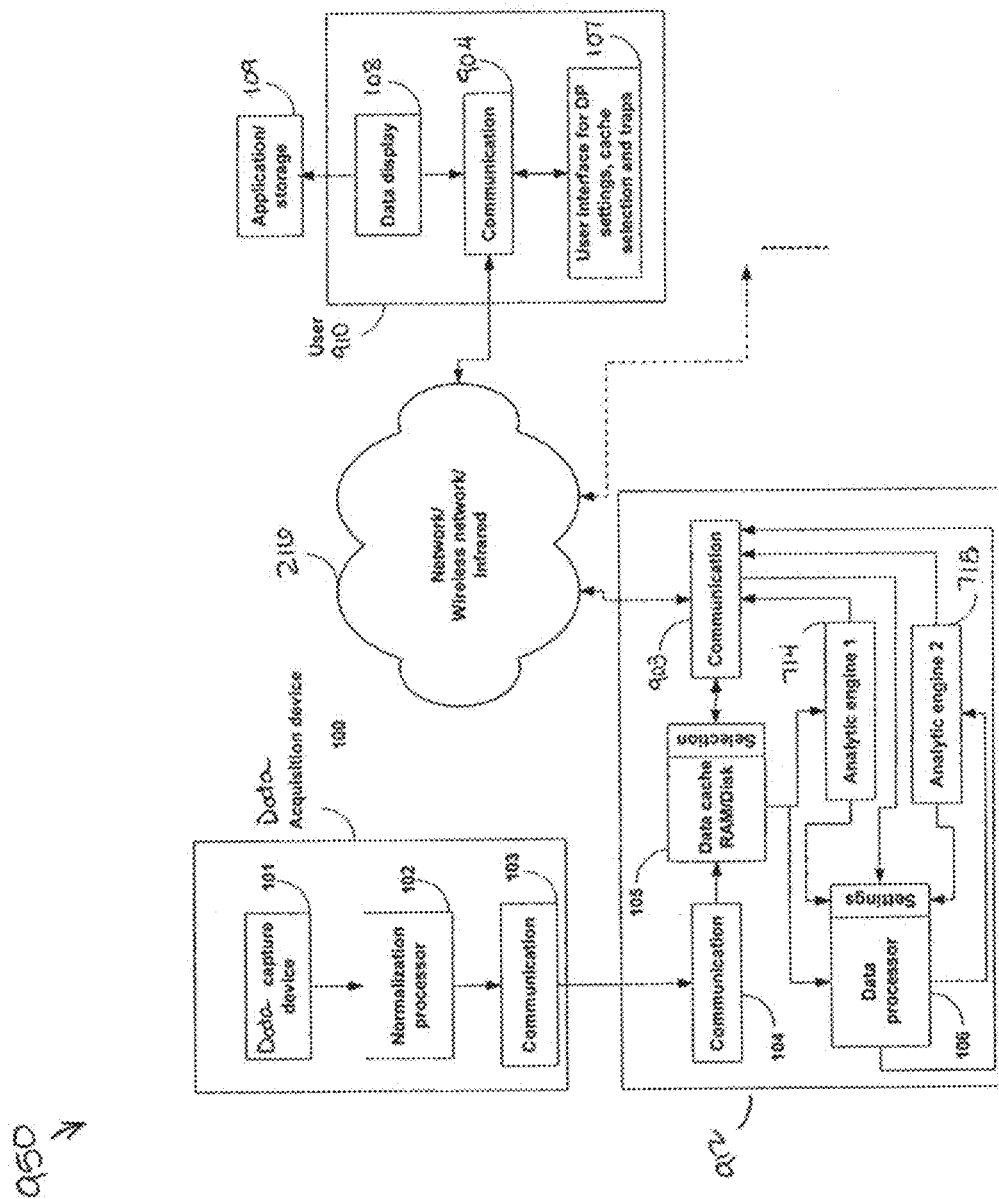
FIG. 9 is a block diagram of an embodiment of a remotely deployed data acquisition and rescanning system having a first and a second analytic engine.

FIG. 9 is a block diagram of an embodiment of a remotely deployed data acquisition and rescanning system 950 comprising the first analytic engine 714 and the second analytic engine 718. The data acquisition and rescanning system 950 comprises the data acquisition device 100, a storage and processing system 912, a user system 910, and the acquisition/storage device 109.

The data acquisition device comprises the data capture device 101, the normalization processor, and the communication device 103.

The storage and processing system 912 comprises the communication device 104, the random access data cache 105, the data processor 106, the first analytic engine 714, the second analytic engine 718, and a communication device 903.

The user system 910 comprises a communication device 904, the user interface 107, and the data display 108.

The raw data from the acquisition device 100 are transmitted, via a fast connection using the communication devices 103 and 104, to the storage and processing system 912. The raw data and the metadata are stored at the cache 105. The data processor 106 processes the raw data using the default data processor settings.

At the data storage and processing system 912, the raw data are stored at the data cache 105. Selected raw data are analyzed by the first analytic engine 714. The selection mechanism can be either automatic or interactive as described in the embodiments above. The analysis performed by the first analytic engine 714 yields an improved or close to optimal data processor settings given the selected raw data. The settings are transferred to the data processor 106, and the raw data are processed with the given settings.

The processed data are transferred to the second analytic engine 718. At the second analytic engine 718 the processed data are analyzed and improved data processor settings are determined. The second analytic engine 718 determines the quality of the processed data using a metric. The second analytic engine 718 selects new processor settings depending on the quality of the processed data as determined by the metric. The improved settings are transmitted to the data processor 106 and the raw data are reprocessed. The step reprocessing the processed data with the revised data processor settings and the step of analyzing the processed data and determining revised data processor settings are repeated until convergence, i.e. until the metric cannot detect any improvements in the quality of the processed data, as described above. This yields improved or optimal processor settings.

The user system 910 communicates with the storage and processing system 912 via a communication medium 216 using the communication devices 903 and 904. The processed data are displayed at the data display 108. The data processor settings can be adjusted interactively using the user interface 107.

The user, through the user system 910, can transmit the processed data to the application/storage 109 for further processing as well as storage. Additionally the user can, via the user interface 107, access subsections, or zones of the raw data stored at the random access data cache 105 to be processed at the data processor 106.

The data acquisition and rescanning system 950 allows the non real time interactive processing of specific raw data. The data acquisition and rescanning system 950 is similar to the data acquisition and rescanning system 750 with the user system 910 located remotely from the data acquisition device 100 and the storage and processing system 912. In the remotely deployed system 950, the data cache 105, the data processor 106, the first analytic engine 714, and the second analytic engine 718 are local to the data acquisition device 100.

The data acquisition and rescanning system 950 also supports multiple user usage. The data acquisition device 100 can be accessed by multiple user systems 910 with each data processor 106 having unique processor settings. The data acquisition and rescanning system 950 is implemented, at least in part, as software, firmware, or a combination of software and firmware.

Figure 10:
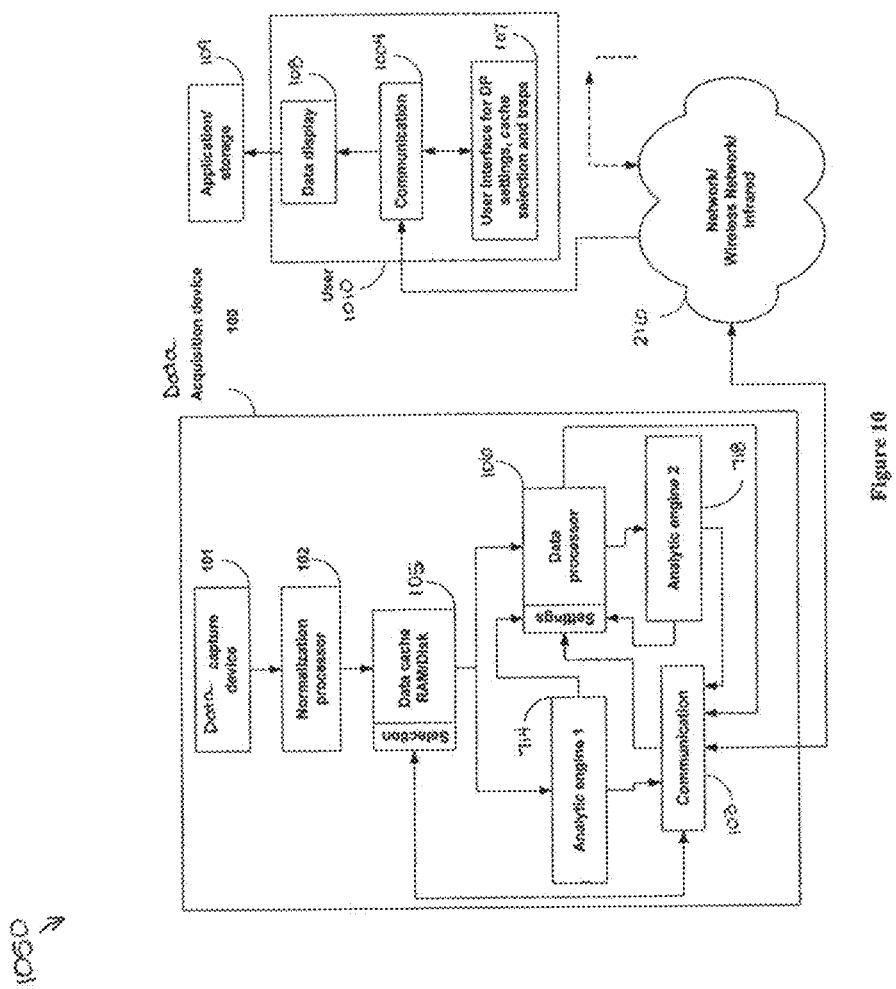
FIG. 10 is a block diagram of a hardware implemented embodiment of a remotely deployed data acquisition and rescanning system having a first and a second analytic engine.

FIG. 10 is a block diagram of a hardware implemented embodiment of a remotely deployed data acquisition and rescanning system 1050 comprising the first analytic engine 714 and the second analytic engine 718. The data acquisition and rescanning system 1050 implements the data acquisition and rescanning system 850 shown in FIG. 8 in a remote deployment. The data acquisition and rescanning system 1050 comprises the data acquisition device 100, a user system 1010, and the application/storage device 109.

The random access data cache 105, the data processor 106, the first analytic engine 714, and the second analytic engine 718 are implemented as hardware at the acquisition device 100. The data acquisition device 100 further comprises the data capture device 101, the normalization processor 102, and the communication device 103.

The user system 1010 comprises the user interface 107, the data display 108, and a communication device 1004. The user system 1010 communicates with the data acquisition device 100 via the communication medium 216 using the communication devices 103 and 1004.

Figure 11:
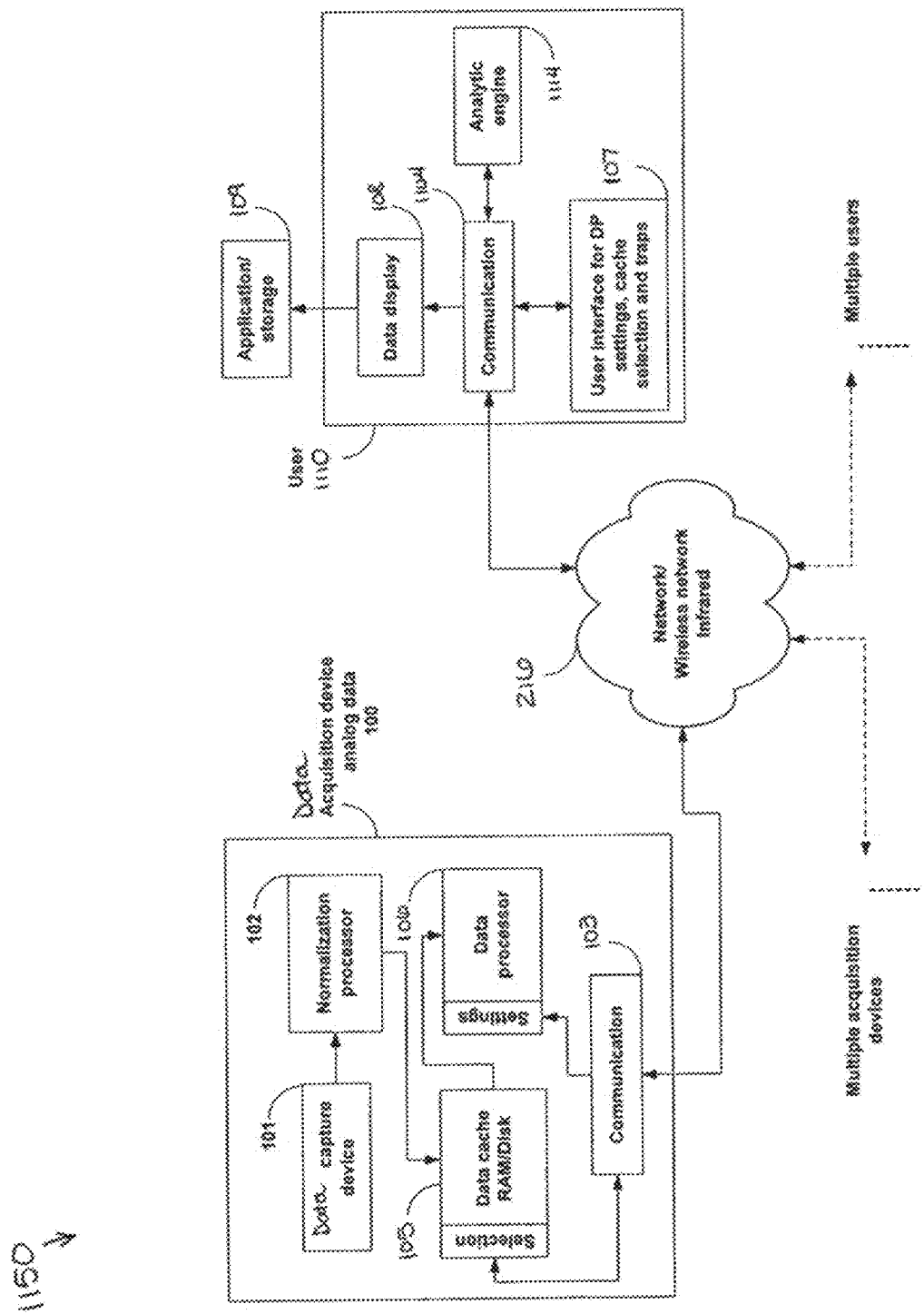
FIG. 11 is a block diagram of an embodiment of a data acquisition and rescanning system comprising multiple acquisition devices and having multiple users.

FIG. 11 is a block diagram of an embodiment of a data acquisition and rescanning system 1150 comprising a plurality of data acquisition devices 100 and a plurality of user systems 1110. The plurality of user systems 1110 are located remotely from the plurality of data acquisition devices 100.

The data acquisition device 100 comprises the data capture device 101, the normalization processor 102, the communication device 103, the random access data cache 105, and the data processor 106. In an embodiment, the data processor 106 is a low processing capability engine.

The user system 1110 comprises the user interface 107, the data display 108, a communication device 1104, and an analytic engine 1114. In an embodiment, the analytic engine 1114 is a high performance analytic processor.

Analog data are presented to the acquisition device 100. The analog capture device 101 measures the analog data. The normalization processor 102 transforms the measured data into normalized raw data. The data processor 106 is used for transformations of the data. The transformed data are stored at the random access data cache 105. Examples of data processing include, but are not limited to: document orientation, background compensation, color compensation, text extraction, text background extraction, threshold correlation, despeckle, and the like.

Working in a real time broadcast push mode or upon request from at least one of the user systems 1110, selected cached data are scaled and compressed by the data processor 106. The communication device 105 sends the scaled and compressed data, and the associated tag or metadata to the user system 1110 via the communication medium 216 using the communication device 103.

In an embodiment, the tag data comprises the capture device address and the data location in the cache 105. In an embodiment, the metadata comprise, but are not limited to, a tag identifying the data and the location in the cache, a time and date stamp of the acquisition. The sequence number, the beginning of the data band, the end of the data band, height, width, a pointer to the next band, and the like. The tag data is embedded in the communication network protocol of the communication medium 216.

The user system 1110 receives the data via the communication medium 216 and the communication device 1104. The data is analyzed by the analytic engine 1114. If the analysis detects some relevant data area(s) characterized by analysis results that are outside of a boundary determined by the user, the analytic engine 1114 activates the user interface 107 by sending the tag associated with the data and the location of the area(s) of interest within the data.

The user interface 107 can be an automatic or a manual operation. The user interface 107 uses the tag content and the area location to request a new data set with new processing settings from the corresponding data capture device 100. The data processor 106 reprocesses the selected data using the new settings and the data capture device 100 retransmits the reprocessed data to the user system 1110. This virtual rescan operation is an interactive process, which can use different settings or windows.

During the interactive process described above, the data continue to be transmitted in real time of the plurality of the capture devices 100 to the plurality of user systems 1110. In an embodiment, the user, through the data display 108, can visualize any of the incoming data. In an embodiment, any part of the receiving data can be stored by the application/storage device 109. In an embodiment, the user. system 1110 can lock selected data in the data cache 105 of one or more data acquisition devices 100 associated with the selected data. When the user system 1110 receives the selected data at the desired resolution, the user system 1110 unlocks the data. In an embodiment, the user system 1110 has an authorization level in order to lock data. The non-locked data in the data cache 105 is overwritten in a first in first out model.

Exemplary Embodiments

This section includes exemplary embodiments of a virtual rescan workflow, a detection orientation method, a detect bleed-through method, a color detection method, a background smoothing method, and a detection of scanned page boundaries method.

Exemplary Virtual Rescan (VRS) Workflow

If, in an embodiment, the user chooses to scan images with VRS processing, the VRS processing initializes the scanner to acquire a raw (unprocessed) master image. The master image is in grayscale if the user chooses to scan in black and white, else the master image is in grayscale or color as the user specifies.

VRS processing also initializes the scanner using predefined scanner specific settings. These settings help the VRS processing improve performance. For example, one of the settings is to perform overscanning (i.e., scan more than the size requested so VRS can perform a good deskew operation).

The scanner scans an image, per the specified settings, and the raw image is transmitted from the scanner to a VRS cache.

The VRS software performs one or more image processing algorithms. In an embodiment, an analytic engine comprises the VRS. One algorithm determines the actual page boundaries within the scanned raw image. In an embodiment, the scanned image contains scanner-introduced background due to overscanning Determining the page boundaries is done for a variety of backgrounds, such as black, white, grey, and the like. Techniques, such as streak detection, are used, for example, for line streaks introduced by a dirty scanner camera/lamp, rollers, or the like. Other techniques, such as page border shadow detection are used to determine a page boundary.

Another image processing algorithm determines if the scanned page is blank. A page may contain colors that bleed through from the other side of the page when scanning is done in duplex. If the algorithm determines that the page contains no content, the page can be deleted per the user setting.

Another image processing algorithm converts the page contents from an RGB color representation to a YCbCr (luminance, hue, and saturation format). This permits many color related operations on the hue and saturation aspects of the page, and hence, results in a speed improvement. If the scanner scans the image in black and white, this step is not performed.

Yet another image processing algorithm analyzes the image. Possible analyses are performing luminance analysis and extracting the grayscale intensity information into a histogram, extracting color information into a color histogram, performing geometric analysis on the page, and the like.

Another image processing algorithm detects whether the document has color, based on previous analyses. If there is no color content, the algorithm sets the scanner settings to indicate that the document is a black and white document. If document has background color and that background color is the predominant color, the algorithm sets the scanner settings to indicate that the document is a color document. Additionally, if the document contains color content, the user can adjust the scanner settings to reproduce the color or not to reproduce the color, based on a determination of whether the color content is related to specific document content, or is a predominate characteristic of the document, such as a document on yellow paper.

Another image processing algorithm performs gamma correction on the image to adjust the brightness and color levels.

A further image processing algorithm performs deskew and cropping on the page image based on the previous analyses.

Yet another image processing algorithm detects textual orientation in the image and rotates the image orthogonally, if required.

Another image processing algorithm performs other operations, such as, for example, barcode detection, line filtering, despeckling, annotating with an endorsement string, or the like.

A further image processing algorithm performs background smoothing by detecting the background colors and merging them together.

If the image has problems that cannot be corrected automatically, the image processing software displays the processed image and the settings to the user. The user then determines the settings for the image. As the user changes the settings, the image processing software performs one or more of the image processing algorithms discussed above using the user specified settings and displays the processed image to user. When the user accepts the image, the image processing software re-processes the raw image using the final settings chosen by the user.

In another embodiment, a second analytic engine performs additional analyses to determine if the processed image meets predetermined requirements. If the image does not meet the predetermined requirements, the second analytic engine determines new settings and reprocess the raw image using the new settings. This process repeats until the image meets the requirements.

When the image processing is complete, the image processing software sends the image to the application.

Exemplary Detect Orientation

In an embodiment, the detect orientation algorithm automatically detects which way to orthogonally rotate a text page for viewing. The algorithm selects possible individual characters from connected components of black within the page. The algorithm then determines the orientations of the individual characters by employing a trained neural network. The algorithm uses the orientation results of the neural network to determine a better page orientation.

The algorithm finds the connected components within the page image. Since some of these components can contain graphic elements, the algorithm uses a number of constraints to filter out non-characters within the page image. Examples of the constraints are the number of pixels exceeds a predetermined threshold; both width and height are large enough; the ratio of height to width does not exceed a predetermined threshold; the ratio of the number of black pixels in the connected component to the area of its bounding box is not too large or too small; the size of the component does not approach the size of the page; and the number of transitions from white to black and back along a line crossing the character in either horizontal or vertical direction is not too large.

Some of the components passing this test may contain glued characters, pieces of broken characters, and the like. In an embodiment, assuming reasonable image quality, a statistically meaningful majority contains individual characters.

The algorithm proportionally scales of each of the components to fit into a gray-scale square of 20 by 20 pixels. The algorithm then adds a 2 pixel white margin around the gray-scale square and sends the resulting 24×24 image to a trained feed-forward neural network for orientation detection.

The neural network used in the algorithm, in an embodiment, has a preprocessing layer that converts the 576 inputs into 144 features. The features pass through two hidden layers of 180 and 80 nodes, respectively. The result of the neural network is four outputs indicating confidences in "up", "down", "left", or "right" orientation. This neural network with its rather distinct preprocessing using Gabor Wavelets has been described in the papers, "A Subspace Projection Approach to Feature Extraction: The Two-Dimensional Gabor Transform for Character Recognition", Neural Networks, 7 (8), pp. 1295-1301, 1994, and "Neural Network Positioning and Classification of Handwritten Characters", Neural Networks 9 (4), pp. 685-693, 1996. The training of the neural network is not a part of the run-time algorithm and is performed off-line using scaled characters from common business fonts, such as, for example, Arial, Times Roman, Courier, and the like.

Next, the algorithm decides whether to accept the orientation having the highest confidence level. The algorithm decides based on confidence ratios that exceed predetermined thresholds.

For increased or maximum accuracy, in an embodiment, the analysis of the page utilizes the components found within it. Typically, for most text pages a small percentage of the components is sufficient to make a confident decision. To achieve a reasonable tradeoff between accuracy and speed, the page is divided into several sets of stripes. The stripes in each set are distributed over the page to make the selection of components quasi-random. If, in an embodiment, the number of good connected components in the first set exceeds a predefined number and the votes confidently determine the winning orientation, the algorithm returns the result. Otherwise, the next set of stripes is processed, then the next, etc., until the end condition is met, or until all or a predetermined percentage of the components on the page have been examined.

Recognition of character shapes becomes more difficult as the font size and resolution become smaller. For the algorithm to perform well, in an embodiment, the height of binary characters exceeds 16 pixels. The algorithm can show graceful degradation for characters up to 8 pixels in height.

The algorithm, in an embodiment, may assume that the majority of connected components on the page are individual characters.

Embodiments of the algorithm have been trained with the Latin alphabet. Since there are many common shapes between Latin and Cyrillic as well as between the Latin and Greek alphabets, the algorithm also performs well for Cyrillic and Latin. The algorithm can be trained specifically for different character sets.

Exemplary Detect Bleed-Through

An embodiment of the detect bleed-through algorithm addresses automatically detecting bleed-through on sides of scanned documents in order to perform further image processing on these pages. In an embodiment, the algorithm uses page boundary detection within front and back scanned images to approximately match side coordinates. Then, the algorithm uses existing color or gray content to fine-tune the mapping. This additional step can be used because of slightly different optics and skews of front and back cameras. If residual (unexplained) content fall below predetermined density criterion, the algorithm determines that the page is blank.

In an embodiment, the algorithm detects each side of the page against the background of the scanner. Next, the algorithm runs individual blank page detection on both sides of the page to determine if one or both sides of the page are blank regardless of possible bleed-through. If one or both sides are blank, the algorithm ends.

If one or both sides are not blank, the algorithm determines the main background of the page on both sides. Next, the algorithm chooses the side with greater volume of content as the front side. Next, the algorithm maps the back side to the front side using corresponding rectangles of the page.

Dark pixels with color sufficiently different from the background are marked on both sides to form mask images. The algorithm analyzes the mask images locally block by block to determine the local shift relative to the rough mapping. Next, the algorithm uses a Least Mean Squares approximation to finalize the back-to-front mapping. The algorithm cancels content on the back side within a predefined distance of darker content on the front side, and then the algorithm sends the residual image to the blank page detection step.

Exemplary Color Detection

An embodiment of the color detection 'algorithm detects the color content in a scanned image and distinguishes between the foreground and background color. The algorithm eliminates the background color if it is the most predominant color in the document. The algorithm examines pixels in the scanned image and determines if the pixel is a color pixel and if the pixel is a background pixel. This determination uses the saturation and luminance levels of the pixel.

In an embodiment, the algorithm converts the image from an RGB representation to a YCbCr (Luma and Chrominance) representation. The algorithm looks at the saturation component of the pixel to determine the saturation level. Saturation provides a measure of the amount of color in a pixel. The higher the saturation, the more vivid the color. The lower the value, the less color the pixel contains. Saturation is expressed as a number between 0 and 182, which comes from the mathematical formulation used to calculate saturation. A user adjustable color threshold value, in an embodiment, is used to determine if a pixel is a color pixel. If the saturation value is greater than the threshold, the pixel is color, else it is not.

The algorithm determines if the pixel is a background pixel. When scanner scans a document, the white or black background of the document and/or the scanner can appear as a low saturated light or dark color. For most images, the amount of background pixels is a large percentage of the total area. The color detection algorithm, in order to exclude the contributions of the white and/or black background portions of an image, uses a white background threshold, a black background threshold, and a background saturation threshold to determine background pixel membership. If, in an embodiment, the luminance of a pixel is higher than the white background threshold or lower than the black background threshold, and the saturation of the pixel is lower than the background saturation threshold, then the pixel is a classified as a background pixel. Otherwise, the pixel is non-background pixel.

The algorithm analyzes the non-background pixels to determine the various color contents by building a histogram of the pixels based on their saturation values. A scanner can introduce some color to the scanned image because of the lamp or the camera. A dirty camera can add color spots, for instance. If a color saturation value of a pixel is below a predetermined threshold, the algorithm determines that the pixel does not have color. Otherwise, the pixel is considered a valid color. If the document contains any valid color, the document is considered a color document.

Exemplary Background Smoothing

An embodiment of the background smoothing algorithm reduces the number of colors within the backgrounds of an image to improve the appearance of the image as well as decreases the size of the image after compression.

The algorithm clusters the colors found in the image and selects those that contain enough pixels to be considered backgrounds.

The algorithm determines the co-occurrence of the background clusters to determine if two or more clusters actually represent a single background. These types of backgrounds are commonly generated by dithering or using microdots, which the eye perceives as the averaged color within the background. When the scanner scans the image at a high resolution, the individual colors are seen for each of the pixels. The algorithm merges the co-occurring clusters and calculates an average color for the cluster.

Then, the algorithm determines if backgrounds have neighboring clusters with colors that are slightly darker or slightly brighter. Often, when scanning, for example, the paper going through the transport will buckle due to the rollers and forces acting on the paper, and can create shadows and highlights within the image. These shadows and highlights can be perceived as different clusters and they can be merged with the main background.

The algorithm modifies the image pixel by pixel by searching the image and determining if the color of the pixel belongs to one of the background clusters. If the pixel belongs to a background cluster, the algorithm changes the pixel color to the averaged color of the cluster.

Exemplary Detection of Scanned Page Boundaries

The detection of scanned page boundaries algorithm automatically detects page boundaries within a scanned image. Generally, page skew detection algorithms used in the industry work reliably only for black background scanning where the contrast between very dark background of the scanner and typically white page is difficult to miss. In an embodiment, this algorithm detects the page against any background, thus, performing page skew correction and cropping even for white background scanners.

Since there may be very small color or gray level differences between the background of the scanner and the background of the page, the differences alone cannot be relied upon to detect the page boundary paints. Instead, the algorithm calculates and compares statistics collected in a small window centered on pixels of analysis. The algorithm compares these statistics to the range of the statistics collected in the corners of the scanned image, where the algorithm expects the background of the scanner.

The algorithm calculates the statistics in the four corners of the scanned image. If some of the corners are not uniform, which can occur when the content of the page is close to the corner, the algorithm does not consider the non-uniform corners.

If some of the corners are significantly different from the other corners, the algorithm chooses the majority of like corners. If the choice has to be made between equally plausible alternatives, the algorithm compares the corners to the background of the inside of the scanned image in order to disqualify the background of an over-cropped page.

For qualifying corners, the algorithm aggregates the statistics of the scanner background for later use.

The algorithm searches rows and columns of the scanned image looking for the first and last pixel with statistical properties significantly different from those of the scanner background. Predetermined thresholds determine the significance of the deviations of the pixel-centered windows from the range of the scanner background.

The detected first and last non-background pixels can be used to determine candidate edge points. Several constraints are used to filter out outliers. For example, if searching for the left boundary of the page, the candidate edge point has immediate neighbors above and below such that the angles formed by connecting segments are within 45 degrees from the vertical and are close to each other. Candidate edge points are analyzed with a variant of a Least Mean Square approximation to find best straight lines representing the main rectangle of the page. The algorithm assigns a confidence measure to the found rectangle based on the ratio of edge points supporting the rectangle to the maximum possible number of edge points, which may depend on the size of the page, the resolution of the scan, and the like.

After the algorithm determines the angle of skew, the algorithm, checks if individual edge points outside of the main rectangle of the page have enough support from their neighbors to indicate a tab or another existing deviation from the assumed rectangular shape of the page. Edge points deemed meaningful are used to determine the crop lines.

In case of dual scanning, the algorithm reconciles the skew angles between the front and back of the page image. If the angles of skew detected on the front side are different from that of the back side, it is likely that one of the two is wrong. In this case, the algorithm uses the angle associated with the higher confidence and recalculates crop lines for the other side.

Similarly, if the crop lines on the front and back significantly disagree, the algorithm reconciles the crop lines between the front and back of the page image. The algorithm considers the differences between the main rectangle of the page and its crop line to determine and remove extensions due to scanner artifacts.

In an embodiment, the detection of page boundaries algorithm assumes that the background of the scanner is uniform, that variation in brightness between individual sensors over the width of the scan are not significant, and that there are very few non-functioning or badly calibrated sensors causing streaks.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

Iterative Recognition-Guided Thresholding and Data Extraction

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 12-1 illustrates an architecture 12-100, in accordance with one embodiment. As shown in FIG. 12-1, a plurality of remote networks 12-102 are provided including a first remote network 12-104 and a second remote network 12-106. A gateway 12-101 may be coupled between the remote networks 12-102 and a proximate network 12-108. In the context of the present architecture 12-100, the networks 12-104, 12-106 may each take any form including, but not limited to a LAN, a WAN such as the Internet, public switched telephone network (PSTN), internal telephone network, etc.

In use, the gateway 12-101 serves as an entrance point from the remote networks 12-102 to the proximate network 12-108. As such, the gateway 12-101 may function as a router, which is capable of directing a given packet of data that arrives at the gateway 12-101, and a switch, which furnishes the actual path in and out of the gateway 12-101 for a given packet.

Further included is at least one data server 12-114 coupled to the proximate network 12-108, and which is accessible from the remote networks 12-102 via the gateway 12-101. It should be noted that the data server(s) 12-114 may include any type of computing device/groupware. Coupled to each data server 12-114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 12-120 or series of peripherals 12-120, e.g., facsimile machines, printers, networked and/or local storage units or systems, etc., may be coupled to one or more of the networks 12-104, 12-106, 12-108. It should be noted that databases and/or additional components may be utilized with, or integrated into, any type of network element coupled to the networks 12-104, 12-106, 12-108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 12-104, 12-106, 12-108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

FIG. 12-2 shows a representative hardware environment associated with a user device 116 and/or server 12-114 of FIG. 12-1, in accordance with one embodiment. Such figure illustrates a typical hardware configuration of a workstation having a central processing unit 210, such as a microprocessor, and a number of other units interconnected via a system bus 12-212. The workstation shown in FIG. 12-2 includes a Random Access Memory (RAM) 12-214, Read Only Memory (ROM) 12-216, an I/O adapter 12-218 for connecting peripheral devices such as disk storage units 12-220 to the bus 12-212, a user interface adapter 12-222 for connecting a keyboard 12-224, a mouse 12-226, a speaker 12-228, a microphone 12-232, and/or other user interface devices such as a touch screen and a digital camera (not shown) to the bus 12-212, communication adapter 12-234 for connecting the workstation to a communication network 12-235 (e.g., a data processing network) and a display adapter 12-236 for connecting the bus 12-212 to a display device 12-238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. Patents, Patent Publications, and/or Patent Applications incorporated herein by reference. For example, digital images suitable for processing according to the presently disclosed algorithms may be subjected to image processing operations, such as page detection, rectangularization, detection of uneven illumination, illumination normalization, resolution estimation, blur detection, classification, extraction, etc.

In more approaches, the presently disclosed methods, systems, and/or computer program products may be utilized with, implemented in, and/or include one or more user interfaces configured to facilitate performing any functionality disclosed herein and/or in the aforementioned related patent applications, publications, and/or patents, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related patent applications, publications, and/or patents, among others that would be appreciated by one having ordinary skill in the art upon reading these descriptions.

It will further be appreciated that embodiments presented herein may be provided in the form of a service deployed on behalf of a customer to offer service on demand.

Intelligent, Iterative Recognition-Guided Thresholding

In general, the presently disclosed inventive concepts encompass the notion of performing a recognition-guided thresholding and extraction process on individual regions of interest of a digital image to maximize the quality of the processed (preferentially a binarized image, since a great number of OCR engines rely on binary images as input) for subsequent extraction of information therefrom. The process is iterative in that individual regions of interest are identified, and subjected to a plurality of thresholding and extraction iterations, in an attempt to identify the best quality image for extraction. The process is intelligent in that a training phase is employed from which a priori expectations may be developed regarding the nature (e.g. identity, location, size, shape, color, etc.) of information depicted in images of objects belonging to a common classification, e.g. driver's licenses issued by a particular state. These a priori expectations may be leveraged in subsequent operations directed to extracting information from other objects belonging to the same classification, for example by matching an expected region of interest identity with an expected region of interest location, it is possible to acquire confidence in the extraction result. For instance, and as will be described in further detail below, by matching a region of interest location with an expected region of interest identity, the result of extraction from various image "frames" subjected to different threshold levels may be evaluated to determine whether the extraction at one particular threshold is "correct."

In the training phase, image features (such as the bounding box locations and OCR results from various regions of interest) are determined for a plurality of images depicting representative exemplars of a class of object, such as a document or person. The features are determined using a learn-by-example classification technique. Features are analyzed to determine characteristic features of the subject of the image. For example, characteristic features include any suitable feature upon which a person or item may be identified, such as the dynamic location range for the region (i.e. a subset of pixels within the image in which a field or object is statistically likely to be located, which may preferably be determined based on observing location of many exemplars in the training phase); median height, width, or other dimension(s) of each region; appropriate character set for each region; text or image formatting for each region; text color for each region; background color for each region; text alignment for each region; etc. as would be understood by a person having ordinary skill in the art upon reading the present descriptions.

A set of characteristic features is preferably defined as corresponding to objects belonging to a particular class of object based on this training. In this manner, it is possible to subsequently facilitate identification of characteristic features based on object class, and vise-versa, in various embodiments. For example, an image may be labeled as depicting a particular class of object, and features of the individual object belonging to that particular class may be determined based in whole or in part on the class definition including the characteristic object features. Conversely, an object may be determined to belong to the particular class based on determining an image of the object depicts some or all of the characteristic features defined in the class definition.

A trained system, algorithm, technique, etc. as referenced above is provided a test or sample image, e.g. an image depicting a document belonging to a particular class of objects for which the system, algorithm, technique, etc. was trained. Using the test image, the presently disclosed inventive concepts perform an initial classification and extraction operation such as described in U.S. Patent Publication No. 2014/0270439; and/or U.S. Patent Publication No. 2014/0270536 and attempt to extract as much information as possible from the image based on the object class and corresponding extraction model.

However, for various reasons including background/foreground overlap, complex background, etc., at least some of the information cannot be reliably extracted. For example, in one embodiment an image depicts a driver's license wherein the name, date of birth, expiration date, etc. partially overlap with a state seal depicted in the background of the driver's license and a hologram overlaying the text (e.g. embedded in a laminate layer overlaying the foreground text and the background state seal). Worse still, the name, date of birth, expiration date, etc. is depicted in a font color substantially similar to the color of the state seal, but significantly contrasting with other portions of the driver's license background.

In preferred embodiments, training therefore may also encompass the initial attempt to extract information, such that particular elements within the image which are robustly difficult or impossible to accurately extract may be identified. This "trouble region" information may be included as part of the characteristic features of the object, such that computational cost of performing iterative, recognition-guided thresholding as described further below is minimized. As will be appreciated by skilled artisans, it is incredibly difficult if not impossible to define appropriate parameters for extracting underlying information such as text from an image that depicts text or other foreground regions having both substantial similarity and substantial contrast with the background region(s) they respectively overlay/overlap. This is in part because extracting underlying information relies in some form on reducing the color depth of the received image, e.g. from RGB to grayscale or bi-tonal, before performing recognition, e.g. OCR. As a result, where a region depicts both significantly similar and significantly contrasting foreground and background elements, it is not possible to define color suppression (e.g. binarization) parameters which generate a legible result for both the significantly similar foreground/background elements and the significantly contrasting foreground/background elements.

Instead, color suppression parameters may be configured to boost the contrast between the significantly similar foreground/background elements, but this generally renders the significantly contrasting foreground/background elements illegible. In the opposite scenario, e.g. without contrast boosting, the significantly contrasting foreground/background elements are legible, but the significantly similar foreground/background elements are not. In rare circumstances, it may be possible to achieve an intermediately contrasting result by boosting contrast only slightly, but in practice this approach does not adequately facilitate extraction of all elements within the region of interest.

In order to accomplish accurate and reliable extraction of both significantly similar and significantly contrasting foreground/background elements within a single image or region of interest of an image, the presently disclosed inventive concepts propose an iterative, intelligent, recognition-guided thresholding and extraction process. In essence, and with reference to a string of text characters as the exemplary embodiment, the thresholding process may be performed in a manner that renders a legible result on a per-character basis, and upon achieving a legible result, extraction is performed on the legible result, and the process proceeds to obtain a legible result for other characters in the string. Upon accurately extracting all individual characters, the string may be reconstructed from the aggregate extraction results, including the extracted portion(s) of the image, as well as the result of extracting the region of interest (e.g. OCR result). As described herein, this basic procedure is referred to as recognition-guided thresholding.

Of course, it should be understood that recognition-guided thresholding as generally described herein may be performed on the basis of any suitable confidence criterion, and need not evaluate textual information as a means of deriving such confidence information. For example, in various approaches image features may serve as the basis for deriving confidence.

In one implementation, a recognition-guided thresholding process may identify a region of interest depicting one or more image features. Characteristics of the image features (e.g. size, location, shape, color profile, etc.) may be known based on a training operation such as a learn-by-example classification training operation. For example, a class of documents includes an image feature comprising an embedded security mark that overlaps with or is otherwise partially obscured by background textures appearing in the document. In order to authenticate the document, it is necessary to extract and verify the security mark. So as to overcome the apparent obscurity or overlap, it may be advantageous to apply an iterative thresholding process as described herein, and evaluate confidence of result under each threshold on the basis of image features in the thresholded region matching corresponding image features in thresholded training images.

Of course, any other equivalent means of determining confidence as to whether a particular image feature matches an expected image feature may be employed without departing from the scope of the present disclosures.

Recognition-guided thresholding and extraction may also preferably include color normalization as an aspect of improving extraction robustness and accuracy. As discussed herein, color normalization should be understood as normalizing intensity values across the various color channels (e.g. R, B and G) to "stretch" each channel onto a single normalized scale. Most preferably, color normalization is performed prior to thresholding, and may be performed for each region of interest independently or on the aggregate of all regions of interest. This is particularly advantageous where foreground and background are similar and relatively dark, and assists in discriminating between foreground and background by "stretching" the values across the entire intensity range.

For instance, an image region is characterized by pixels having a RGB color profile. No pixel in the region has an intensity value greater than 100 in any color channel. Each color channel permits intensity values in a range from 0-255. In this scenario, color normalization may effectively set the maximum intensity value of 100 as corresponding to the maximum value in the range, and "stretch" the intervening values across the entire color space, such that each difference of 1 intensity unit in the original image becomes effectively a difference of 2.55 intensity units.

Of course, it should be understood that the iterative thresholding and extraction process described above is equally applicable to extraction of non-textual information, such as lines or other document structures, graphical elements, etc., as long as there is a quality criterion (as akin to OCR confidence for characters, e.g. a classification-based or other feature-matching confidence measure) evaluating the result. For example, consider a graphical element depicting a gradient of color, which progresses from contrasting with the background to substantially representing the background color the graphical element overlays. In such circumstances, it is similarly possible to progress along the gradient (or other pattern or progression) using an iterative thresholding process to extract a legible or clear version of the graphic.

In practice, and according to another exemplary approach based on connected components, images of a particular class of object such as a document depict a plurality of regions of interest corresponding to photograph(s), document structure, graphical elements, text fields, etc. A plurality of such images are used in a training phase as described above, and subsequent to training an image depicting a plurality of regions of interest is analyzed.

As referred-to herein, it should be understood that the term "connected component" refers to any structure within a bitonal image that is formed from a contiguous set of adjacent black pixels. For example connected components may include lines (e.g. part of a document's structure such as field boundaries in a form), graphical elements (e.g. photographs, logos, illustrations, unique markings, etc.), text (e.g. characters, symbols, handwriting, etc.) or any other feature depicted in a bitonal image. Accordingly, in one embodiment a connected component may be defined within a bitonal image according to the location of the various pixels from which the component is formed.

The term "image feature" is to be understood as inclusive of connected components, but also includes such components as may be defined within color spaces other than a bitonal image. Thus, an image feature includes any structure of an image that is formed from a contiguous set of adjacent pixels. The image feature may be defined according to the location of constituent pixels as noted above for connected components, but may also include other information such as intensity information (e.g. in one or more color channels).

Based on the training phase, each region of interest expected to appear is known a priori, preferably both in terms of the statistically-likely location of the region, as well as an expected identity of one or more image features and/or connected components located within the region (including an expected set of possible identities, such as a subset of alphanumeric characters, pixel color channel values, feature shape, size, etc. or other identifying characteristics of one or more connected components located within the region of interest.)

This information is utilized to perform conventional classification and extraction, by which a plurality of expected regions of interest are successfully extracted, while others are either not found or imperfectly extracted.

One or more particular regions of interest, e.g. depicting a field partially or wholly overlaying a seal, logo, or other similar background texture, may be known to be among the "trouble regions" defined in the classification, and/or imperfect/incomplete extraction results from the conventional attempt, it is determined that Recognition-guided thresholding should be applied to the particular regions of interest.

Each of the particular regions of interest are subjected to a color normalization process to stretch the intensity values in each color channel, thereby enhancing ability to distinguish between foreground and background elements.

In one exemplary approach, where the confidence measure is OCR confidence and the primary but nonexclusive objective is to threshold textual information, each particular region is matched to a corresponding region of interest known from the training set, e.g. based on its location, and is rendered (e.g. in grayscale) using channel weights derived from the analysis of foreground and background colors so that the foreground in the rendered image is made dark vs. lighter background. If the foreground is known or determined to be brighter than the background, this rendered image is inverted.

For each region of interest, a plurality of thresholds are applied to the rendered image, which is preferably a grayscale image, of the rectangular region encompassing the region of interest. Each threshold represents a different intensity value along a range of intensity values (e.g. grayscale intensity), and generates a different binary image with a number of connected components. Each component is subjected to a recognition process such as optical character recognition to attempt extracting information therefrom, e.g. character identity. As will be understood by those having ordinary skill in the art, the OCR may achieve varied results across the set of connected components. However, it is extremely likely that in at least one such binary image the component will be legible and the extraction will match expected extraction results based on the training set. For example, the extracted character may match an expected character or match one of a set of possible expected characters with high confidence, and deemed a candidate on this basis.

While the above example contemplates performing a plurality of thresholding operations on a particular region, it is also within the scope of the present disclosures to perform thresholding on a per-component or a per-feature basis. For example, in one approach a particular region may depict text having a known character spacing, or depict one or more image features according to a known pattern. It may be advantageous in some approaches to perform thresholding on individual features rather than the region as a whole. For example, the region may be divided according to the known character spacing or pattern, and each subregion defined therein may be separately subjected to thresholding, which may utilize different parameters than a thresholding process applied to the region as a whole.

In this manner, it is possible to tailor the thresholding to the individual feature or component desired for extraction, and its immediately surrounding background region, without needing to consider the differences between the foreground and background of the region as a whole.

For instance, in one approach a credit card may depict a credit card number comprising a plurality of characters arranged in a line and having equal spacing between each character. The credit card number as a whole may be encompassed within a region of interest, which may be matched as described above. In addition or in the alternative to performing region-based thresholding as above, thresholding may include subdividing the region into a plurality (e.g. 16) subregions of interest, and performing thresholding on each individual region. This may be particularly useful in situations where, e.g., the credit card depicts a complex background whereby some but not all of the characters in the credit card number are in "trouble spots" and overlap or are obscured by unique background elements, such that no single threshold applied to the region as a whole can identify character(s) overlapping one or more of the unique background elements. By isolating those characters, thresholding may be specifically performed on the "trouble spot" to maximize the likelihood of achieving a candidate result with sufficient confidence for extraction.

In any event, as the threshold value diminishes the amount of black in the binary image is reduced and connected components become thinner and break into smaller components. Performing OCR on the sequence of progressively thinning components associated with diminishing threshold levels with significant overlap of their bounding boxes generates a sequence of candidates, and as the components break up a formerly single candidate with a wider bounding box may be replaced by a more confident pair or triple associated with a lower threshold level. The candidates with highest confidences form the final string, and since each winning label may be associated with several consecutive threshold levels, there is a choice: from which thresholded image to pull the corresponding bounding box into the final binary rendition of the original region of interest.

Upon identifying the threshold range for each candidate in the region of interest, the various bounding boxes (and/or extraction results obtained therefrom) may be assembled into a cohesive result. As noted in further detail herein, in some embodiments where the various portions of the image corresponding to each component are to be assembled, it is advantageous to select a legible bounding box (but not necessarily the one with the highest confidence character) for some or all of the components in order to generate a more consistent visual result. As another advantage, the presently disclosed inventive, Recognition-guided thresholding process provides superior accuracy and reliability even outside the context of foreground elements that overlap with similar background elements. For instance, and as known in the art, extraction may be frustrated or rendered impossible due to poor image quality, e.g. arising from insufficient illumination in the capture environment, presence of artifacts such as shadows, etc.

To address these common problems, conventional image processing algorithms seek to improve the quality of the image as a whole, which yields moderate improvements to extraction capability, e.g. via correcting a uniformly insufficient illumination and permit improved distinction between foreground and background elements. However, these conventional solutions approach the rectification process from the perspective of the image, rather than individual elements of the image (e.g. connected components), and thus are limited in applicability and efficacy because adjustments that may be appropriate for one portion of an image are not appropriate or are less appropriate for other portions of the image.

By contrast, the presently disclosed inventive concepts can provide extraction that is robustly capable of extracting only the information from the image that most closely matches expected information based on training, both in terms of information content (e.g. text character identity) as well as location (e.g. center pixel, dynamic region, etc.). In particularly preferred approaches, extracted information matches the expected information in terms of information content, location, and size.

For instance, and as will be appreciated by persons having ordinary skill in the art upon reading the present descriptions, insufficient contrast between foreground and background in a digital image can have the effect of making foreground elements appear larger, due to "blobifying" of the foreground element. As a result, in an image having insufficient contrast, an expected element may be identifiable, but the appearance of the element may be unreliably identifiable due to obscured boundaries between foreground and background, or the identity of the element may be in question because the element is not fully contained within the dynamic region where the element is expected based on training.

Similarly, when contrast is excessive, a single element in an image may appear "broken" into several constituent elements (e.g. connected components) which may be unrecognizable or problematically represent an incorrect element (e.g. a capital letter "H" representing two adjacent "1" or "1" characters when the cross-bar is broken or missing). By leveraging the expected identity, location, and size, the presently disclosed concepts may more accurately and robustly determine, e.g. based on the width of spacing between the two "1" or "1" characters, the location within the image, and/or the identity of the components extracted from a corresponding location in training, that the component is actually a capital H instead of adjacent "1" or "1" characters.

In addition and/or alternatively, the presently disclosed inventive concepts may include determining a more appropriate image intensity to utilize prior to extracting the "H" character based on an iterative thresholding process as described herein. Accordingly, not only may overall extraction may be improved with respect to compliance with expected results, the quality of information extracted may be bolstered by selectively thresholding the region from which the component is to be extracted.

Thus, while conventional image processing techniques are limited to determining the best possible extraction based on the overall image, the presently disclosed techniques can evaluate each element individually at varying levels of image intensity, and thus provide a more accurate extraction result (e.g. by selecting a frame where the component most closely matches the size, shape, and location expected by training from among a plurality of frames, where each frame depicts the component at a different level of image intensity). In addition, the overall extraction process is more robust since this process can be performed individually for each component, rather than on the image as a whole, increasing the likelihood of extracting a similarly accurate result from even drastically different renditions of the same image, or from different portions of a single image (e.g. illuminated region versus shadowed region).

Those having ordinary skill in the art will also appreciate that this Recognition-guided thresholding and extraction technique may generate resulting extracted versions of portions of a component or element which exhibit perhaps drastically different appearance, to the point of potentially looking like a "mosaic" or "ransom note" stitched together from multiple images. For example, adjacent characters, one of which overlays a dark background but the other of which overlays only a bright background, may be extracted based on very different image intensity levels and thus appear very different upon recreating or synthesizing a composite of the extracted components.

To alleviate this artifact, it is advantageous to select from among plural exemplary frames of a component so as to minimize the overall range of frame intensity across a particular set of components. For instance, assuming a two-component element is represented by a plurality of frames for each component, each of the plurality of frames being characterized by a different intensity level. While it may be the case that the most legible frame for the first component is characterized by an intensity of 100, and the most legible frame for the second component is characterized by an intensity of 20, if each component has a frame that is legible (even if not most legible) and characterized by a value closer to the midpoint between the two values (i.e. 60), it is preferable in some approaches to choose the frames that more closely match in intensity to generate a single, consistently intense result.

In practical application, the presently disclosed inventive techniques have been applied to images depicting driver licenses. Training involved providing a plurality of exemplar driver licenses from a particular state, identifying characteristic features thereof, defining a classification based on the characteristic features, and attempting classical extraction.

Based on this training, several "trouble regions" were identified, and intelligent, iterative thresholding was applied to these regions when processing subsequent test images. From experimentation, it was determined that iterative, intelligent thresholding as described herein employ approximately twenty thresholds with which to investigate the image to determine ideal extraction parameters and perform extraction therewith.

The various threshold levels may be evenly distributed across a particular range, e.g. grayscale intensity ranging from 0-255, or may be staggered throughout a particular range, e.g. according to predetermined intensity levels known to generate desirable extraction results.

Again, according to experimental results, it is apparent that distributing the threshold levels across a grayscale intensity ranging from 1 to 120 (i.e. each threshold corresponding to a 6-point intensity increment).

As will be appreciated by skilled artisans, different threshold values, distributions, or ranges may be appropriate depending on the nature of the image data to be processed. The aforementioned experimentally determined values were established as optimal for processing complex documents having primarily a white or light colored background, with a plurality of dark background and foreground elements depicted thereon.

The following images represent experimental results determined from a Massachusetts driver's license when attempting to extract an expiration date that overlaps the state seal in a "trouble region" where thresholding and extraction using conventional (e.g. OCR) approaches cannot obtain the entire date. In all images, the expiration date is Jun. 27, 2013 (represented as "Jun. 23, 2013"). The images have been enlarged to emphasize differences.

First, FIG. 12-3 shows the rendition of the image in color, where many different background textures underlay the month, date and the majority of the year.

FIG. 12-4 depicts the same portion of the driver's license, appearing in a grayscale rendition of the color image shown in FIG. 12-3.

FIG. 12-5, below, depicts a plurality of binary images generated using a plurality of different thresholds as described herein. Each image is characterized by a difference in threshold value of 6 with respect to its vertically adjacent counterpart. Thus, here the first image corresponds to a threshold value of 115, while the last image corresponds to a threshold value of 1 (each on a scale from 0-255).

FIGS. 12-6A (enlarged) and 12-6B (native size) depict a composite image generated by extracting high-confidence characters from the plurality of thresholded images shown in FIG. 12-5.

In even more embodiments, it may be advantageous to essentially invert the assumptions (and potentially, the image data), e.g. when attempting to detect a light foreground element on a light background as opposed to a dark foreground element depicted on a dark background. This inversion may be particularly advantageous when one particular component overlays multiple different background textures, or when a particular component depicts multiple colors or textures itself.

The presently disclosed inventive concepts also encompass performing binarization (which in various embodiments involves a thresholding process, but which does not necessarily employ the iterative, Recognition-guided approach described presently) based on classification, e.g. as described in related US patent publications 2014/0270439, and 2014/0270536.

Validation

In additional embodiments, classification and/or extraction results may be presented to a user for validation, e.g. for confirmation, negation, modification of the assigned class, etc. For example, upon classifying an object using semi- or fully automated processes in conjunction with distinguishing criteria such as defined herein, the classification and the digital image to which the classification relates may be displayed to a user (e.g. on a mobile device display) so that the user may confirm or negate the classification. Upon negating the classification, a user may manually define the "proper" classification of the object depicted in the digital image. This user input may be utilized to provide ongoing "training" to the classifier(s), in preferred approaches. Of course, user input may be provided in relation to any number of operations described herein without departing from the scope of the instant disclosures.

In even more preferred embodiments, the aforementioned validation may be performed without requiring user input. For instance, it is possible to mitigate the need for a user to review and/or to correct extraction results by performing automatic validation of extraction results. In general, this technique involves referencing an external system or database in order to confirm whether the extracted values are known to be correct. For example, if name and address are extracted, in some instances it is possible to validate that the individual in question in fact resides at the given address.

This validation principle extends to classification, in even more embodiments. For example, if the extraction is correct, in some approaches it is appropriate to infer that the classification is also correct. This inference relies on the assumption that the only manner in which to achieve the "correct" extraction result (e.g. a value matches an expected value in a reference data source, matches an expected format for the value in question, is associated with an expected symbol or other value, etc. as would be understood by one having ordinary skill in the art upon reading the present descriptions).

While the present descriptions of data extraction within the scope of the instant disclosure have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Similarly, a computer program product within the scope of the present descriptions may include a computer readable storage medium having program code embodied therewith, the program code readable/executable by a processor to cause the processor to perform steps of a method as described herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

Accordingly, one embodiment of the present invention includes all of the features disclosed herein, including those shown and described in conjunction with any of the FIGS. Other embodiments include subsets of the features disclosed herein and/or shown and described in conjunction with any of the FIGS. Such features, or subsets thereof, may be combined in any way using known techniques that would become apparent to one skilled in the art after reading the present description.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented data processing method comprising:
　receiving image data from a data acquisition device;
　automatically analyzing, using a first analytic engine, at least portions of the image data to determine whether the image data is within a first set of parameters;

generating a first set of processor settings when the image data is not within the first set of parameters;

processing the image data with the first set of processor settings to generate processed data;

automatically analyzing, using a second analytic engine, at least portions of the processed data to determine whether the processed data is within a second set of parameters and if not, generating a second set of processor settings using the second analytic engine, wherein generating the second set of processor settings comprises independently identifying a binarization threshold range for each image feature depicted in the at least portions of the processed data;

reprocessing the image data using the second set of processor settings to generate reprocessed data; and outputting at least one of the processed data and the reprocessed data;

wherein the second set of parameters is different than the first set of parameters; and wherein the first set of processor settings and the second set of processor settings each relate to one or more image characteristics selected from: brightness, contrast and gamma.

2. The method as recited in claim 1, further comprising performing a plurality of thresholding iterations, each thresholding iteration comprising:

the analyzing at least portions of the processed data to determine whether the processed data is within the second set of parameters, and if not, generating the second set of processor settings to reprocess the image data; and the reprocessing the image data with the second set of processor settings to generate the reprocessed data, and wherein for each of the plurality of thresholding iterations, the second set of processor settings comprises a different binarization threshold than a binarization threshold employed in an immediately previous thresholding iteration.

3. The method as recited in claim 2, each thresholding iteration further comprising: extracting image features from one or more of the processed data and the reprocessed data.

4. The method as recited in claim 2, each thresholding iteration further comprising: extracting textual information from one or more of the processed data and the reprocessed data, and the method further comprising assembling the extracted textual information from two or more of the thresholding iterations.

5. The method as recited in claim 1, further comprising performing a plurality of thresholding iterations on a per-feature basis.

6. The method as recited in claim 4, wherein the extracted textual information comprises a plurality of characters, and the method further comprising:

determining a threshold level of each of the plurality of characters from each of the two or more thresholding iterations; and selecting a set of optimal characters based on the threshold level of each of the plurality of characters; and wherein the assembling further comprises assembling the set of optimal characters into a composite image.

7. The method as recited in claim 1, wherein the at least portions of the image comprise one or more trouble regions identified based on a learn-by-example (LBE) training process.

8. The method as recited in claim 4, further comprising validating the extracted textual information.

9. The method as recited in claim 1, wherein the processing includes applying a color conversion algorithm, and wherein applying the color conversion algorithm comprises normalizing intensity values across one or more color channels of the image data, the one or more color channels being selected from R, G and B.

10. The method as recited in claim 1, wherein at least one of the first set of parameters and the second set of parameters comprise a classification confidence value threshold.

11. The method as recited in claim 1, wherein each of the first set of processor settings and the second set of processor settings comprise one or more binarization thresholds.

12. The method as recited in claim 1, wherein analyzing at least portions of the image data to determine whether the image data is within the first set of parameters comprises optical character recognition (OCR).

13. The method as recited in claim 1, wherein analyzing at least portions of the image data to determine whether the image data is within the first set of parameters comprises a connected components analysis.

14. The method as recited in claim 1, wherein the at least portions of the image data comprise a plurality of regions of interest each depicting one or more image features, and the method further comprising locating the plurality of regions of interest within the image data based at least in part on a learn-by-example (LBE) training operation; and wherein analyzing at least portions of the image data to determine whether the image data is within the first set of parameters comprises an image classification operation based at least in part on the learn-by-example (LBE) training operation.

15. The method as recited in claim 1, further comprising inverting the image data.

16. A computer program product configured to perform data processing, the computer program product comprising a non-transitory computer readable storage medium having stored thereon computer readable program instructions configured to cause one or more processors, upon execution of the instructions, to:

receive image data from a data acquisition device;

analyze at least portions of the image data to determine whether the image data is within a first set of parameters;

generate a first set of processor settings when the image data is not within the first set of parameters;

process the image data with the first set of processor settings to generate processed data;

perform a plurality of thresholding iterations, each thresholding iteration comprising:

analyzing at least portions of the processed data to determine whether the processed data is within a second set of parameters, and if not, generating a second set of processor settings to reprocess the image data;

reprocessing the image data with the second set of processor settings to generate the reprocessed data;

extracting textual information from one or more of the processed data and the reprocessed data; and wherein for each of the plurality of thresholding iterations, the second set of processor settings comprises a different binarization threshold than a binarization threshold employed in an immediately previous thresholding iteration; and assemble the extracted textual information from two or more of the thresholding iterations; and output at least one of the processed data and the reprocessed data, wherein the second set of parameters is different than the first set of parameters, and wherein the first set of processor settings and the second set of processor settings each relate to one or more image characteristics selected from: brightness, contrast and gamma.

17. The computer program product as recited in claim 16, the computer readable program instructions being further configured to cause one or more processors, upon execution of the instructions, to: perform a plurality of thresholding iterations, each thresholding iteration comprising:

analyzing at least portions of the processed data to determine whether the processed data is within the second set of parameters;

generating the second set of processor settings to reprocess the image data;

reprocessing the image data with the second set of processor settings to generate the reprocessed data; and extracting textual information from one or more of the processed data and the reprocessed data, and wherein for each of the plurality of thresholding iterations, the second set of processor settings comprises a different binarization threshold than a binarization threshold employed in an immediately previous thresholding iteration.

18. A computer-implemented data processing device comprising one or more processors configured to execute logic; and logic configured to cause at least one of the processors, upon execution of the logic, to:

receive image data from a data acquisition device;

analyze at least portions of the image data to determine whether the image data is within a first set of parameters;

generate a first set of processor settings when the image data is not within the first set of parameters;

process the image data with the first set of processor settings to generate processed data;

perform a plurality of thresholding iterations, each thresholding iteration comprising:

analyzing at least portions of the processed data to determine whether the processed data is within a second set of parameters, and if not, generating a second set of processor settings to reprocess the image data;

reprocessing the image data with the second set of processor settings to generate the reprocessed data;

extracting textual information from one or more of the processed data and the reprocessed data; and wherein for each of the plurality of thresholding iterations, the second set of processor settings comprises a different binarization threshold than a binarization threshold employed in an immediately previous thresholding iteration; and validate the extracted textual information; and output at least one of the processed data and the reprocessed data, wherein the second set of parameters is different than the first set of parameters, and wherein the first set of processor settings and the second set of processor settings each relate to one or more image characteristics selected from: brightness, contrast and gamma.

19. The device as recited in claim 18, further comprising logic configured to cause one or more of the processors to:

analyze at least portions of the processed data to determine whether the processed data is within the second set of parameters;

generate the second set of processor settings to reprocess the image data;

reprocess the image data with the second set of processor settings to generate the reprocessed data; and extract textual information from one or more of the processed data and the reprocessed data, and wherein for each of the plurality of thresholding iterations, the second set of processor settings comprises a different binarization threshold than a binarization threshold employed in an immediately previous thresholding iteration.

* * * * *

UNITED STATES PATENT AND TRADEMARK OFFICE
CERTIFICATE OF CORRECTION

| | |
|---|---|
| PATENT NO. | : 9,769,354 B2 |
| APPLICATION NO. | : 14/814455 |
| DATED | : September 19, 2017 |
| INVENTOR(S) | : Christopher W. Thrasher et al. |

It is certified that error appears in the above-identified patent and that said Letters Patent is hereby corrected as shown below:

In the Specification

Column 37, Line 11 please replace "(represented as "Jun. 23, 2013")." with --(represented as "06-27-2013").--.

Signed and Sealed this
Twenty-eighth Day of May, 2019

Andrei Iancu
*Director of the United States Patent and Trademark Office*